United States Patent
Rana et al.

(10) Patent No.: US 10,817,484 B2
(45) Date of Patent: *Oct. 27, 2020

(54) APPARATUS, SYSTEMS, AND METHODS FOR PROVIDING LOCATION INFORMATION

(71) Applicant: Factual Inc., Los Angeles, CA (US)

(72) Inventors: Ahad Rana, Los Angles, CA (US); Boris Shimanovsky, Los Angles, CA (US)

(73) Assignee: FACTUAL INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/590,312

(22) Filed: Oct. 1, 2019

(65) Prior Publication Data

US 2020/0034341 A1   Jan. 30, 2020

Related U.S. Application Data

(63) Continuation of application No. 16/367,161, filed on Mar. 27, 2019, now Pat. No. 10,459,896, which is a
(Continued)

(51) Int. Cl.
*G06F 16/21* (2019.01)
*G06N 20/00* (2019.01)
(Continued)

(52) U.S. Cl.
CPC ......... *G06F 16/21* (2019.01); *G05B 13/0265* (2013.01); *G06F 16/23* (2019.01);
(Continued)

(58) Field of Classification Search
CPC ........ G06F 16/21; G06F 16/322; G06F 16/22; G06F 16/38; G06F 16/33; G06F 16/332;
(Continued)

(56) References Cited

U.S. PATENT DOCUMENTS

| 584,791 A | 6/1897 | Propst |
| 5,701,467 A | 12/1997 | Freeston |

(Continued)

FOREIGN PATENT DOCUMENTS

| CN | 102004793 A | 4/2011 |
| CN | 102955792 A | 3/2013 |

(Continued)

OTHER PUBLICATIONS

Supplementary European Search Report/Opinion EP14725817, Dec. 1, 2016, 6 pages.

(Continued)

*Primary Examiner* — Meless N Zewdu

(57) ABSTRACT

The disclosed apparatus, systems, and methods relate to a location query mechanism that can efficiently determine whether a target entity is located within a region of interest (ROI). At a high level, the location query mechanism can be configured to represent a ROI using one or more polygons. The location query mechanism can, in turn, divide (e.g., tessellate) the one or more polygons into sub-polygons. Subsequently, the location query mechanism can use the sub-polygons to build an index system that can efficiently determine whether a particular location is within any of the sub-polygons. Therefore, when a computing device queries whether a particular location is within the region of interest, the location query mechanism can use the index system to determine whether the particular location is within any of the sub-polygons.

24 Claims, 18 Drawing Sheets

Related U.S. Application Data continuation of application No. 16/006,748, filed on Jun. 12, 2018, now Pat. No. 10,268,708, which is a continuation of application No. 15/673,349, filed on Aug. 9, 2017, now Pat. No. 10,013,446, which is a continuation of application No. 14/214,296, filed on Mar. 14, 2013, now Pat. No. 9,753,965.

(60) Provisional application No. 61/799,986, filed on Mar. 15, 2013, provisional application No. 61/800,036, filed on Mar. 15, 2013, provisional application No. 61/799,131, filed on Mar. 15, 2013, provisional application No. 61/799,846, filed on Mar. 15, 2013, provisional application No. 61/799,817, filed on Mar. 15, 2013.

(51) Int. Cl.

| | | |
|---|---|---|
| *G06F 16/23* | (2019.01) | |
| *G06F 16/29* | (2019.01) | |
| *G06F 16/35* | (2019.01) | |
| *G06F 16/28* | (2019.01) | |
| *G06F 16/31* | (2019.01) | |
| *G06F 16/951* | (2019.01) | |
| *G06F 16/2458* | (2019.01) | |
| *G06F 16/2455* | (2019.01) | |
| *G06Q 10/10* | (2012.01) | |
| *G06Q 50/00* | (2012.01) | |
| *G05B 13/02* | (2006.01) | |
| *H04W 4/029* | (2018.01) | |
| *H04W 76/38* | (2018.01) | |
| *H04W 4/50* | (2018.01) | |
| *G06Q 30/02* | (2012.01) | |
| *H04L 12/24* | (2006.01) | |
| *H04W 4/02* | (2018.01) | |
| *H04W 4/021* | (2018.01) | |
| *H04W 8/08* | (2009.01) | |
| *H04W 8/16* | (2009.01) | |
| *H04W 8/18* | (2009.01) | |
| *H04W 16/24* | (2009.01) | |
| *H04W 64/00* | (2009.01) | |
| *H04W 88/02* | (2009.01) | |
| *G06N 5/02* | (2006.01) | |
| *G06F 16/335* | (2019.01) | |
| *H04W 16/00* | (2009.01) | |
| *H04W 16/30* | (2009.01) | |
| *H04W 16/32* | (2009.01) | |
| *H04W 88/00* | (2009.01) | |

(52) U.S. Cl.
CPC ........ *G06F 16/235* (2019.01); *G06F 16/2379* (2019.01); *G06F 16/2386* (2019.01); *G06F 16/2477* (2019.01); *G06F 16/24564* (2019.01); *G06F 16/282* (2019.01); *G06F 16/285* (2019.01); *G06F 16/29* (2019.01); *G06F 16/313* (2019.01); *G06F 16/35* (2019.01); *G06F 16/951* (2019.01); *G06N 5/022* (2013.01); *G06N 20/00* (2019.01); *G06Q 10/101* (2013.01); *G06Q 30/0261* (2013.01); *G06Q 30/0282* (2013.01); *G06Q 50/01* (2013.01); *H04L 41/14* (2013.01); *H04W 4/02* (2013.01); *H04W 4/021* (2013.01); *H04W 4/025* (2013.01); *H04W 4/029* (2018.02); *H04W 4/50* (2018.02); *H04W 8/08* (2013.01); *H04W 8/16* (2013.01); *H04W 8/18* (2013.01); *H04W 16/24* (2013.01); *H04W 64/00* (2013.01); *H04W 64/003* (2013.01); *H04W 76/38* (2018.02); *H04W 88/02* (2013.01); *G06F 16/337* (2019.01); *H04W 16/00* (2013.01); *H04W 16/30* (2013.01); *H04W 16/32* (2013.01); *H04W 88/00* (2013.01)

(58) Field of Classification Search
CPC ...... G06F 40/12; G06F 40/146; G06F 40/151; G06F 40/154; G06F 11/1024; G06F 11/1479; G06F 11/1604; G06F 16/23; G06F 16/29; G06F 16/35; G06F 16/28; G06F 16/31; G06F 16/951; G06F 16/2458; G06F 16/2455; G06Q 30/02; G06Q 10/10; G06Q 50/00; G06N 20/00; G06N 5/02; H04L 12/24; G05B 2219/32021; G05B 2219/34114; G05B 2219/34115; G05B 2219/34171; G05B 13/0265; G05B 19/41865; G05B 2219/37003; H04W 4/02; H04W 4/025; H04W 4/023; H04W 4/029; H04W 36/32; H04W 88/00; H04W 88/08; H04W 12/1004; H04W 16/00; H04W 16/02; H04W 16/18; H04W 16/24; H04W 16/30; H04W 16/32; H04W 4/50; H04W 64/00; H04W 8/08; H04W 76/38; H04W 88/02; H04W 8/16; H04W 4/021; H04W 8/18
See application file for complete search history.

(56) References Cited

U.S. PATENT DOCUMENTS

| | | |
|---|---|---|
| 6,212,393 B1 | 4/2001 | Suarez et al. |
| 6,317,604 B1 | 11/2001 | Kovach, Jr. et al. |
| 6,360,261 B1 | 3/2002 | Boyd et al. |
| 6,594,791 B2 | 7/2003 | Sipola |
| 7,058,639 B1 | 6/2006 | Chatterjee et al. |
| 7,096,214 B1 | 8/2006 | Bharat et al. |
| 7,137,065 B1 | 11/2006 | Huang et al. |
| 7,271,765 B2 | 9/2007 | Stilp et al. |
| 7,330,850 B1 | 2/2008 | Seibel et al. |
| 7,539,666 B2 | 5/2009 | Ashworth et al. |
| 7,576,754 B1 | 8/2009 | Joseph et al. |
| 7,577,680 B1 | 8/2009 | Williams et al. |
| 7,734,661 B2 | 6/2010 | Jordan et al. |
| RE42,285 E | 4/2011 | Anderson et al. |
| 8,015,185 B2 | 9/2011 | Choi et al. |
| 8,046,001 B2 * | 10/2011 | Shalmon et al. |
| 8,126,825 B2 | 2/2012 | Guyon |
| 8,195,709 B2 | 6/2012 | Pulfer |
| 8,260,769 B1 | 9/2012 | Narieda et al. |
| 8,301,639 B1 | 10/2012 | Myllykmaki et al. |
| 8,326,845 B2 | 12/2012 | Sethi et al. |
| 8,489,596 B1 | 7/2013 | Milton et al. |
| 8,538,973 B1 | 9/2013 | Gonzalez et al. |
| 8,589,069 B1 | 11/2013 | Lehman |
| 8,670,716 B2 | 3/2014 | Yu et al. |
| 8,751,427 B1 | 6/2014 | Mysen et al. |
| 8,843,315 B1 | 9/2014 | Barbeau et al. |
| 8,855,681 B1 | 10/2014 | George et al. |
| 8,909,255 B1 | 12/2014 | Eriksson et al. |
| 8,918,284 B2 | 12/2014 | Tokashiki |
| 8,977,284 B2 * | 3/2015 | Reed ............ H04W 8/02 |
| 9,063,226 B2 | 6/2015 | Zheng et al. |
| 9,317,541 B2 | 4/2016 | Shimanovsky et al. |
| 9,350,532 B2 * | 5/2016 | McCreight et al. ...... H04L 9/00 |
| 9,544,075 B2 * | 1/2017 | Altman et al. ......... H04H 60/90 |
| 9,594,791 B2 * | 3/2017 | Bell et al. ......... G06F 17/30345 |
| 9,600,501 B1 | 3/2017 | Fuller |
| 9,686,646 B1 | 6/2017 | Sorden et al. |
| 9,720,555 B2 | 8/2017 | Sorden et al. |
| 9,736,652 B2 | 8/2017 | Su et al. |
| 9,743,236 B1 | 8/2017 | Pecard et al. |
| 9,753,965 B2 * | 9/2017 | Rana et al. ...... G06F 17/30345 |
| 9,801,095 B2 * | 10/2017 | Henderson et al. .. H04W 28/16 |

(56) References Cited

U.S. PATENT DOCUMENTS

| | | | |
|---|---|---|---|
| 9,906,906 B1 | 2/2018 | Pecard et al. | |
| 9,977,792 B2 | 5/2018 | Bell et al. | |
| 10,013,446 B2 * | 7/2018 | Rana et al. | G06F 17/30345 |
| 10,255,301 B2 | 4/2019 | Bell et al. | |
| 10,268,708 B2 * | 4/2019 | Rana et al. | G06F 17/30289 |
| 10,324,935 B1 | 6/2019 | Patton | |
| 10,331,631 B2 * | 6/2019 | Michels et al. | G06F 16/21 |
| 10,353,934 B1 | 7/2019 | Mehta et al. | |
| 10,397,757 B1 | 8/2019 | Gratton et al. | |
| 10,459,896 B2 * | 10/2019 | Rana et al. | G06F 16/21 |
| 10,484,856 B1 | 11/2019 | Leung et al. | |
| 10,579,600 B2 | 3/2020 | Bell et al. | |
| 2001/0036224 A1 | 11/2001 | Demello et al. | |
| 2002/0138571 A1 | 9/2002 | Trinon et al. | |
| 2002/0188581 A1 | 12/2002 | Fortin et al. | |
| 2003/0036848 A1 | 2/2003 | Sheha et al. | |
| 2003/0135486 A1 | 7/2003 | Edlund et al. | |
| 2003/0204484 A1 | 10/2003 | Charpiot et al. | |
| 2004/0181526 A1 | 9/2004 | Burdick et al. | |
| 2004/0185863 A1 | 9/2004 | Ogami | |
| 2004/0254920 A1 | 12/2004 | Brill et al. | |
| 2005/0073708 A1 | 4/2005 | Oh et al. | |
| 2005/0096997 A1 | 5/2005 | Jain et al. | |
| 2005/0134935 A1 | 6/2005 | Schmidtler et al. | |
| 2005/0240580 A1 | 10/2005 | Zamir et al. | |
| 2006/0004850 A1 | 1/2006 | Chowdhury | |
| 2006/0149774 A1 | 7/2006 | Egnor | |
| 2006/0195565 A1 | 8/2006 | De-Poorter | |
| 2006/0248106 A1 | 11/2006 | Milne et al. | |
| 2006/0253481 A1 | 11/2006 | Guido et al. | |
| 2006/0085177 A1 | 12/2006 | Bailey | |
| 2006/0277197 A1 | 12/2006 | Bailey | |
| 2006/0287810 A1 | 12/2006 | Sadri et al. | |
| 2007/0005556 A1 | 1/2007 | Ganti et al. | |
| 2007/0030824 A1 | 2/2007 | Ribaudo et al. | |
| 2007/0072582 A1 * | 3/2007 | Nurmi | 455/404.2 |
| 2007/0088603 A1 | 4/2007 | Jouppi et al. | |
| 2007/0100796 A1 | 5/2007 | Wang | |
| 2007/0149216 A1 | 6/2007 | Mikikangas | |
| 2007/0245118 A1 | 10/2007 | Suponau et al. | |
| 2007/0256006 A1 | 11/2007 | Meyers | |
| 2008/0077314 A1 | 3/2008 | Ishikawa | |
| 2008/0248815 A1 | 10/2008 | Busch | |
| 2009/0005968 A1 | 1/2009 | Vengroff et al. | |
| 2009/0024546 A1 | 1/2009 | Ficcaglia et al. | |
| 2009/0089149 A1 | 4/2009 | Lerner et al. | |
| 2009/0106228 A1 | 4/2009 | Weinman, Jr. | |
| 2009/0119222 A1 | 5/2009 | O'Neil et al. | |
| 2009/0124241 A1 | 5/2009 | Krishnaswamy et al. | |
| 2009/0125321 A1 | 5/2009 | Charlebois et al. | |
| 2009/0132469 A1 | 5/2009 | White et al. | |
| 2009/0132605 A1 | 5/2009 | Nielsen | |
| 2009/0207021 A1 | 8/2009 | Naccache | |
| 2009/0254838 A1 | 10/2009 | Rao et al. | |
| 2009/0280829 A1 | 11/2009 | Feuerstein | |
| 2009/0282019 A1 | 11/2009 | Galitsky et al. | |
| 2009/0287405 A1 | 11/2009 | Liu et al. | |
| 2009/0299952 A1 | 12/2009 | Zheng et al. | |
| 2009/0302952 A1 | 12/2009 | Chan et al. | |
| 2009/0319346 A1 | 12/2009 | Fogel et al. | |
| 2010/0004997 A1 | 1/2010 | Mehta et al. | |
| 2010/0023515 A1 | 1/2010 | Marx | |
| 2010/0079336 A1 | 4/2010 | Skibiski et al. | |
| 2010/0185628 A1 | 7/2010 | Weda et al. | |
| 2010/0214117 A1 | 8/2010 | Hazzani | |
| 2010/0323715 A1 | 12/2010 | Winters | |
| 2011/0029853 A1 | 2/2011 | Garrity et al. | |
| 2011/0145228 A1 | 6/2011 | Laurenzo | |
| 2011/0208427 A1 | 8/2011 | Jansen et al. | |
| 2011/0219226 A1 | 9/2011 | Olsson et al. | |
| 2011/0225288 A1 | 9/2011 | Easterday et al. | |
| 2011/0246059 A1 | 10/2011 | Tokashiki | |
| 2011/0313969 A1 | 12/2011 | Ramu | |
| 2011/0320319 A1 | 12/2011 | Streich | |
| 2012/0028650 A1 | 2/2012 | Cooper et al. | |
| 2012/0031032 A1 | 2/2012 | Deiss et al. | |
| 2012/0047102 A1 | 2/2012 | Petersen et al. | |
| 2012/0047184 A1 | 2/2012 | Purdy | |
| 2012/0066218 A1 | 3/2012 | Rapp et al. | |
| 2012/0084280 A1 | 4/2012 | Bouzas et al. | |
| 2012/0100869 A1 | 4/2012 | Liang et al. | |
| 2012/0110183 A1 | 5/2012 | Miranda et al. | |
| 2012/0182144 A1 | 7/2012 | Richardson et al. | |
| 2012/0185439 A1 | 7/2012 | Chen et al. | |
| 2012/0185455 A1 | 7/2012 | Hedrevich | |
| 2012/0191696 A1 | 7/2012 | Renkes et al. | |
| 2012/0221231 A1 | 8/2012 | Nagata et al. | |
| 2012/0221508 A1 | 8/2012 | Chaturvedi et al. | |
| 2012/0226622 A1 | 9/2012 | Gonzalez et al. | |
| 2012/0253862 A1 | 10/2012 | Davidson | |
| 2012/0260209 A1 | 10/2012 | Stibel et al. | |
| 2012/0278767 A1 | 11/2012 | Stibel et al. | |
| 2012/0303745 A1 | 11/2012 | Lo et al. | |
| 2012/0317110 A1 | 12/2012 | Butterfield et al. | |
| 2012/0331014 A1 | 12/2012 | Skubacz et al. | |
| 2013/0031032 A1 | 1/2013 | Mehta et al. | |
| 2013/0066866 A1 | 3/2013 | Chan et al. | |
| 2013/0066912 A1 | 3/2013 | Chetuparambil et al. | |
| 2013/0073581 A1 | 3/2013 | Sandholm | |
| 2013/0090130 A1 | 4/2013 | Burrell et al. | |
| 2013/0103306 A1 | 4/2013 | Uetake | |
| 2013/0103607 A1 | 4/2013 | Knipfer et al. | |
| 2013/0103697 A1 | 4/2013 | Hill et al. | |
| 2013/0103764 A1 | 4/2013 | Verkasalo | |
| 2013/0157693 A1 | 6/2013 | Mercuri et al. | |
| 2013/0183998 A1 | 7/2013 | Pylappan et al. | |
| 2013/0210463 A1 | 8/2013 | Busch | |
| 2013/0226857 A1 | 8/2013 | Shim et al. | |
| 2013/0227026 A1 | 8/2013 | Jayaram et al. | |
| 2013/0238540 A1 | 9/2013 | O'Donaghue et al. | |
| 2013/0246175 A1 | 9/2013 | Bilange et al. | |
| 2013/0250851 A1 | 9/2013 | Lakhzouri et al. | |
| 2013/0262479 A1 | 10/2013 | Liang et al. | |
| 2013/0267255 A1 | 10/2013 | Liu et al. | |
| 2013/0304758 A1 | 11/2013 | Gruber et al. | |
| 2013/0346347 A1 | 12/2013 | Patterson et al. | |
| 2014/0115009 A1 | 4/2014 | Lashley et al. | |
| 2014/0128105 A1 | 5/2014 | Su et al. | |
| 2014/0270402 A1 | 9/2014 | Condell et al. | |
| 2014/0274022 A1 | 9/2014 | Bell et al. | |
| 2014/0274154 A1 | 9/2014 | Rana et al. | |
| 2014/0278838 A1 | 9/2014 | Novak | |
| 2014/0279674 A1 | 9/2014 | Michels et al. | |
| 2014/0279757 A1 * | 9/2014 | Shimanovsky et al. | G06F 17/30705 |
| 2014/0279811 A1 | 9/2014 | Su et al. | |
| 2014/0289188 A1 | 9/2014 | Shimanovsky et al. | |
| 2015/0081717 A1 | 3/2015 | Pidduck | |
| 2015/0319574 A1 | 11/2015 | Wachter et al. | |
| 2016/0232192 A1 | 8/2016 | Shimanovsky et al. | |
| 2017/0206223 A1 | 7/2017 | Bell et al. | |
| 2018/0011888 A1 | 1/2018 | Rana et al. | |

FOREIGN PATENT DOCUMENTS

| | | |
|---|---|---|
| WO | WO 2002/010989 A2 | 2/2002 |
| WO | WO 2014/145059 A2 | 9/2014 |
| WO | WO 2014/145069 A1 | 9/2014 |
| WO | WO 2014/145076 A2 | 9/2014 |
| WO | WO 2014/145088 A1 | 9/2014 |
| WO | WO 2014/145104 A2 | 9/2014 |
| WO | WO 2014/145106 A1 | 9/2014 |

OTHER PUBLICATIONS

International Search Report and Written Opinion issued by ISA Application No. PCT/US14/029787 dated Aug. 13, 2014, 9 pages.
Franklin, Michael J., et al. "CrowdDB: answering queries with crowdsourcing." Proceedings of the 2011 ACM SIGMOD.
International Preliminary Report on Patentability for International Application No. PCT/US14/029737 dated Sep. 15, 2015, 7 pages.
Smiley, D. "Lucene 4 Spatial," 2012 Basis Technology, Open Source Conference, Oct. 2, 2012, 16 pages.

(56) References Cited

OTHER PUBLICATIONS

International Preliminary Report and Written Opinion for International Application No. PCT/US14/029755 dated Aug. 27, 2014, 10 pages.
Communication pursuant to Rules 161(2) and 162 EPC for European Application No. 14720407.7-1854, dated Nov. 10, 2015, 2 pages.
Communication pursuant to Rules 161(2) and 162 EPC for European Application No. 14720841.7-1951, dated Oct. 30, 2015, 2 pages.
Communication pursuant to Rules 161(2) and 162 EPC for European Application No. 14727983.0-1951, dated Dec. 22, 2015, 2 pages.
Communication pursuant to Rules 161(2) and 162 EPC for European Application No. 14730242.6-1951, dated Oct. 30, 2015, 2 pages.
Communication pursuant to Rules 161(2) and 162 EPC for European Application No. 14725817.2-1951 dated Jan. 5, 2016, 2 pages.
Communication pursuant to Rules 161(2) and 162 EPC for European Application No. 14725818.0-1951, dated Oct. 30, 2015, 2 pages.
Response to Communication pursuant to Rules 161(2) and 162 EPC for European Application No. 14720407.7-1854, dated May 10, 2016, 3 pages.
Claims for Response to Communication pursuant to Rules 161(2) and 162 EPC for European Application No. 14720407.7-1854, dated May 10, 2016, 4 pages.
Response to Communication pursuant to Rules 161(2) and 162 EPC for European Application No. 14720841.7, dated Apr. 29, 2016, 9 pages.
Varma, H.P. et al., "A Data Structure for Spatio-Temporal Databases," International Hydrographic Review, Monaco, vol. 67, Issue 1, XP000565997, Jan. 1990, pp. 71-92.
Specification for Response to Communication pursuant to Rules 161(2) and 162 EPC for European Application No. 14720841.7, dated Apr. 29, 2016, 2 pages.
European Search Report for European Application No. 14720841.7, dated Oct. 6, 2016, 7 pages.
European Search Report for European Application No. 14727983.0-1955, dated Dec. 8, 2016, 9 pages.
Response to Communication pursuant to Rules 161(2) and 162 EPC for European Application No. 14725817.2, dated Jul. 11, 2016, 2 pages.
Claims for Response to Communication pursuant to Rules 161(2) and 162 EPC for European Application No. 14725817.2, dated Jul. 11, 2016, 4 pages.
Claims and Response to Communication pursuant to Rules 161(2) and 162 EPC for European Application No. 14725818.0, dated Apr. 29, 2016, 9 pages.
Communication pursuant to Article 94(3) EPC for European Application No. 14730242.6, dated Nov. 14, 2016, 4 pages.
Claims and Response to Communication pursuant to Rules 161(2) and 162 EPC for European Application No. 14727983.0, dated Jun. 23, 2016, 10 pages.
Response to Communication pursuant to Article 94(3) EPC for European Application No. 14730242.6, dated Mar. 15, 2017, 12 pages.
Italiano, et al., "Synchronization Options for Data Warehouse Designs," Computer, IEEE Computer Society, Mar. 2006, pp. 53-57.
Search Report and Written Opinion for International Application No. PCT/US14/029787 dated Sep. 18, 2014, 7 pages.
International Preliminary Report on Patentability for International Application No. PCT/US14/029787 dated Sep. 15, 2015, 4 pages.
Search Report and Written Opinion for International Application No. PCT/US14/029713 dated Nov. 5, 2014, 7 pages.
Search Report and Written Opinion for International Application No. PCT/US14/029784 dated Dec. 17, 2014, 7 pages.
International Preliminary Report on Patentability for International Application No. PCT/US14/029784 dated Sep. 15, 2015, 6 pages.
Search Report and Written Opinion for International Application No. PCT/US14/029755 dated Sep. 18, 2014, 8 pages.
International Preliminary Report on Patentability for International Application No. PCT/US14/029755 dated Sep. 15, 2015, 5 pages.
International Preliminary Report on Patentability for International Application No. PCT/US14/029713 dated Sep. 15, 2015, 6 pages.
Search Report and Written Opinion for International Application No. PCT/US14/029737 dated Dec. 9, 2014, 8 pages.
Xuan Liu et al., "CDAS: A Crowdsourcing Data Analytics System", Proceedings of the VLDB Endowment, vol. 5. No. 10, pp. 1040-1051.
Wilson Wong, et al. "Ontology Learning from Text: A Look Back and Into the Future"; ACM Comouting Surveys (CSUR); vol. 44; Issue 4; Article No. 20; Aug. 2012; pp. 20.1-20.36.
Juan Ramos, "Using TF-IDF to Determine Word Relevance in Document Queries", The First Instructional Conference on Machine Learning (ICML-2003), proceedings of, Dec. 3, 2003, pp. 1-4.
Kevin W. Boyack, David Newman, Russell J. Duhon, Richard Klavans, Michael Patek, Joseph R. Biberstine, Bob Schijvenaars, Andre Skupin, Nianli Ma, Katy Borner, "Clustering More than Two Million Biomedical Publications: Comparing the Accuracies of Nine Text-Based Similarity Approaches", PLos One, vol. 6, issue 3, e18029, Mar. 2011, pp. 1-11.
Marti A. Hearst and Jan 0. Pedersen, "Reexamining the Cluster Hypothesis: Scatter/Gather on Retrieval Results", SIGIR '96 Proceedings of the 19th annual international ACM SIGIR conference on Research and development in information retrieval, Aug. 18, 1996, pp. 76-84.
Stanislaw Osi'nski and Dawid Weiss, "A Concept-driven Algorithm for Clustering Search Results", IEEE Intelligent Systems, vol. 20, Issue 3, Jun. 13, 2005, pp. 48-54.
Tian, M. et al., "Efficient algorithms for fast integration on large data sets from multiple sources," BMC Medical Informatics and Decision Making, vol. 12, No. 1, 6 pages (Jun. 28, 2012).
Ahmed Metwally, Christos Faloutsos, "V-Smart-Join: A Scalable MapReduce Framework for All-Pair Similarity Joins of Multisets and Vectors," Journal Proceedings of the VLDB Endowment, vol. 5 Issue 8, Apr. 2012, pp. 704-715.
Anonymous, "SpatialPrefixTree (Lucene 4.0.0 api)," https://web.archive.org/web/20130313072002/http://lucene.apache.org/core/4_0_0/spatial/org/apache/lucene/spatial/prefix/tree/SpatialPrefixTree.html Accessed on Jul. 17, 2017, Published on Mar. 13, 2013, 4 pages.
Oosterom, V. P. et al., "The Spatial Location Code," Proceedings of the International Symposium on Spatial Datahandling, XP-002293525, Aug. 12, 1996, 12 pages.
Samet, H. "Hierarchical Spatial Date Structures," Computer Science Department, Center for Automation Research and Institute for Advanced Computer Studies, University of Maryland, XP-002566914, Jul. 17, 1989, pp. 193-212.
R. Baragalia, G. De Francisci Morales, C. Lucchese, "Document Similarity Self-Join with Map-Reduce," Data Mining (ICDM) 2010 IEEE 10th International Conference on Dec. 13, 2010, pp. 731-736.
Lars Kolb et al., "Learning-based entity resolution with MapReduce," Proceeding CloudDB '11 Proceedings of the third international workshop on Cloud data management, Oct. 24, 2011, pp. 1-6.
Qiaozhu Mei et al., "Automatic Labeling of Multinomial Topic Models," KDD '07 Proceedings of the 13th ACM SIGKDD International conference on Knowledge discovery and data mining, Aug. 12, 2007, pp. 490-499.
EP Examination Report EP14725817.2 dated Jul. 17, 2018.
"DAMA Data Management Knowledge System Guidelines", DAMAInternational, p. 226, Beijing: Tsinghua University Publishing House, Jul. 2012) cited in Office action of Application No. CN201480014861.3 with English Translation.
Supplementary European Search Report/Opinion EP18179405, dated Aug. 27, 2018, 9 pages.
Michael J Cafarella: "Extracting and Querying a Comprehensive Web Database", Jan. 1, 2009, pp. 1-7 XP055500317, URL:https://database.cs.wisc.edu/cidr/cidr.

(56) References Cited

OTHER PUBLICATIONS

Sebastian Hellmann et al.: "DBpedia Live Extraction", Nov. 1, 2009 (Nov. 11, 2009), on the Move to Meaningful Internet Systems: Otm 2009, Springer Berlin Heidelberg, Berlin, Heidelberg, pp. 1209-1223.
Anonymous: "Record linkage—Wikipedia", 1-15 Mar. 13, 2013 (Mar. 13, 2013), XP055500110, URL:https://en.wikipedia.org/w/index.php?title=Record_linkage&oldid=543842434.
Breese, John S., David Heckerman, and Carl Kadie. "Empirical analysis of predictive algorithms for collaborative filtering." Proceedings of the Fourteenth conference on Uncertainty in artificial intelligence. Morgan Kaufmann Publishers Inc., 1998, pp. 43-52.
Wang, Cong, et al. "Achieving usable and privacy-assured similarity search over outsourced cloud data." INFOCOM, 2012, Proceedings IEEE. IEEE, 2012.
Andrei Tamilin et al, Context-aware Mobile Crowdsourcing, PN153073, UBICOMP, 12, pp. 1-4 Sep. 8, 2012.
Office Action,Chinese Patent Application No. 201480014828.0, with EnglishTranslation, dated Jan. 2, 2019.
Geohash, Wikipedia, the :flee encyclopedia,Jun. 16, 2014, 6 pages, http://en.wikipedia org/w/index.php?title=Geohash&oldid=52302473.

\* cited by examiner

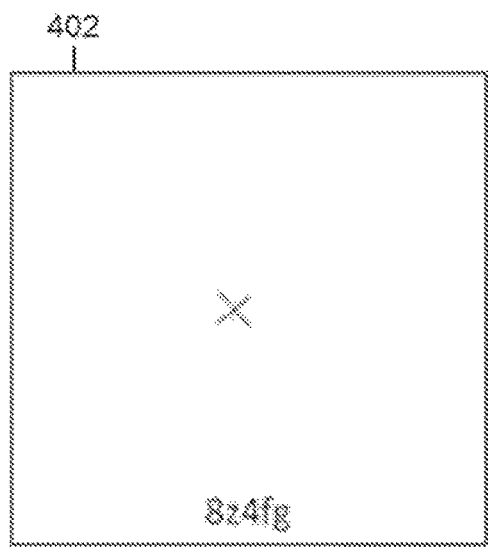 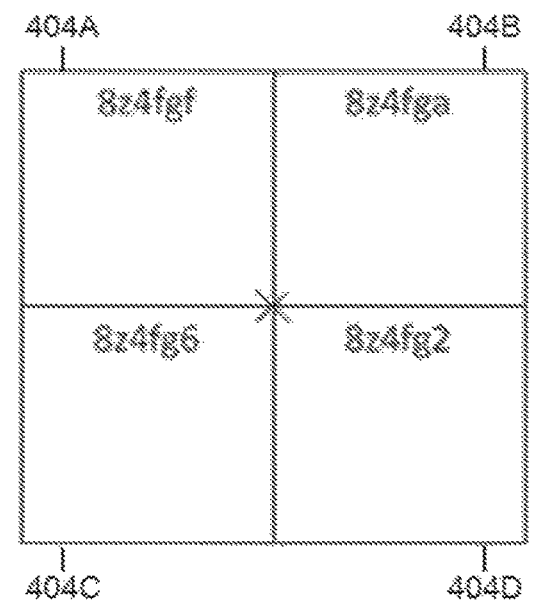
Figure 4A
Figure 4B

APPARATUS, SYSTEMS, AND METHODS FOR PROVIDING LOCATION INFORMATION

CROSS-REFERENCE TO RELATED APPLICATIONS

This application is a continuation of U.S. patent application Ser. No. 16/367,161, filed Mar. 27, 2019, which is a continuation of Ser. No. 16/006,748, filed Jun. 12, 2018, now U.S. Pat. No. 10,268,708, which is a continuation of U.S. patent application Ser. No. 15/673,349, filed Aug. 9, 2017, now U.S. Pat. No. 10,013,446, which is a continuation of U.S. patent application Ser. No. 14/214,296, filed Mar. 14, 2014, now U.S. Pat. No. 9,753,965, entitled "APPARATUS, SYSTEMS, AND METHODS FOR PROVIDING LOCATION INFORMATION", which claims the benefit of the earlier filing date under 35 U.S.C. § 119(e), of:

U.S. Provisional Application No. 61/799,986, filed on Mar. 15, 2013, entitled "SYSTEM FOR ANALYZING AND USING LOCATION BASED BEHAVIOR;"

U.S. Provisional Application No. 61/800,036, filed on Mar. 15, 2013, entitled "GEOGRAPHIC LOCATION DESCRIPTOR AND LINKER;"

U.S. Provisional Application No. 61/799,131, filed on Mar. 15, 2013, entitled "SYSTEM AND METHOD FOR CROWD SOURCING DOMAIN SPECIFIC INTELLIGENCE;"

U.S. Provisional Application No. 61/799,846, filed Mar. 15, 2013, entitled "SYSTEM WITH BATCH AND REAL TIME DATA PROCESSING;" and U.S. Provisional Application No. 61/799,817, filed on Mar. 15, 2013, entitled "SYSTEM FOR ASSIGNING SCORES TO LOCATION ENTITIES."

This application is also related to:

U.S. patent application Ser. No. 14/214,208, filed on Mar. 14, 2014, now U.S. Pat. No. 9,594,791, entitled "APPARATUS, SYSTEMS, AND METHODS FOR ANALYZING MOVEMENTS OF TARGET ENTITIES;"

U.S. patent application Ser. No. 14/214,213, filed on Mar. 14, 2014, entitled "APPARATUS, SYSTEMS, AND METHODS FOR CROWDSOURCING DOMAIN SPECIFIC INTELLIGENCE;"

U.S. patent application Ser. No. 14/214,219, filed on Mar. 14, 2014, now U.S. Pat. No. 9,317,541, entitled "APPARATUS, SYSTEMS, AND METHODS FOR BATCH AND REALTIME DATA PROCESSING;"

U.S. patent application Ser. No. 14/214,309, filed on Mar. 14, 2014, now U.S. Pat. No. 10,331,631, entitled "APPARATUS, SYSTEMS, AND METHODS FOR ANALYZING CHARACTERISTICS OF ENTITIES OF INTEREST;" and U.S. patent application Ser. No. 14/214,231, filed on Mar. 14, 2014, entitled "APPARATUS, SYSTEMS, AND METHODS FOR GROUPING DATA RECORDS."

The entire content of each of the above-referenced applications (including both the provisional applications and the non-provisional applications) is herein incorporated by reference.

FIELD OF THE INVENTION

The present disclosure generally relates to data processing systems, and specifically, to data processing systems that can provide information on geographic location of an entity.

BACKGROUND

As location-aware devices, such as Global Positioning System (GPS)-enabled mobile phones, have become popular over the years, it is increasingly desirable to quickly and efficiently determine whether a device is within a region of interest. Similarly, developers of sports-related mobile applications may wish to provide a different interface for users when users are inside a football stadium or tailgating in the stadium parking lot. Additionally, processing data with location information from, for example, user logs, location tagged social network information (e.g. a stream of tweets from twitter), or similar data can benefit from additional contextual information such as whether the stated location is in a region of interest such as a shopping mall. In such cases, it is desirable to: a) define region(s) of interest, b) determine whether a geographic location point (e.g. latitude and longitude) is within the region(s) of interest, c) if so, identify the region corresponding to the geographic location point, and d) based on the identified region, if any, determine an action to be performed based on the identified region, such as a particular advertisement, user interface, or other computer logic that should occur based on the location being inside the region of interest.

SUMMARY

In general, in an aspect, embodiments of the disclosed subject matter can include an apparatus. The apparatus includes a processor configured to run one or more modules stored in memory. The one or more modules are configured to receive one or more polygons associated with a region of interest, determine a plurality of sub-polygons that are contained within the one or more polygons, wherein each of the sub-polygons is associated with a unique code, and generate a first index system based on at least a subset of the plurality of sub-polygons, thereby providing an efficient mechanism to determine whether a particular location is within the region of interest.

In general, in an aspect, embodiments of the disclosed subject matter can include a method. The method includes receiving, at an index generation module of a computing system, one or more polygons associated with the region of interest, determining, at the index generation module, a plurality of sub-polygons that are contained within the one or more polygons, wherein each of the sub-polygons is associated with a unique code, and generating, at the index generation module, a first index system based on at least a subset of the plurality of sub-polygons, thereby providing an efficient mechanism to determine whether a particular location is within the region of interest.

In general, in an aspect, embodiments of the disclosed subject matter can include a non-transitory computer readable medium. The non-transitory computer readable medium can include executable instructions operable to cause a data processing apparatus to receive one or more polygons associated with a region of interest, determine a plurality of sub-polygons that are contained within the one or more polygons, wherein each of the sub-polygons is associated with a unique code, and generate a first index system based on the tree structure, thereby providing an efficient mechanism to search whether a particular location is within the region of interest.

In any one of the embodiments disclosed herein, the unique code can includes a location identifier based on a hierarchical encoding scheme, such as, for example, a geohash code.

In any one of the embodiments disclosed herein, the index can include one of a hash table or a probabilistic data structure.

In any one of the embodiments disclosed herein, the apparatus, the method, or the non-transitory computer readable medium can include modules, steps, or executable instructions for determining a difference between the index system and a previously-generated index system, and providing the difference to a computing device to update the previously-generated index system in the computing device.

In any one of the embodiments disclosed herein, the apparatus, the method, or the non-transitory computer readable medium can include modules, steps, or executable instructions for identifying a tree structure that models the unique code of the plurality of sub-polygons based on a hierarchy of the unique codes and generating the first index system based on the tree structure.

In any one of the embodiments disclosed herein, the tree structure can include a branch node and a leaf node, and the branch node is associated with a geographic area that is larger than that of the leaf node, and wherein the apparatus, the method, or the non-transitory computer readable medium further includes modules, steps, or executable instructions for generating indices for the index system by traversing the tree structure from the branch node to the leaf node.

In any one of the embodiments disclosed herein, the apparatus, the method, or the non-transitory computer readable medium can include modules, steps, or executable instructions for determining a list of polygons that includes a particular sub-polygon, and associating the list of polygons with a leaf node of the tree structure corresponding to the particular sub-polygon.

In any one of the embodiments disclosed herein, the apparatus, the method, or the non-transitory computer readable medium can include modules, steps, or executable instructions for merging the tree structure, corresponding to the region of interest, with a second tree structure corresponding to a second region of interest, thereby providing a single index system modeling both the first tree structure and the second tree structure.

In any one of the embodiments disclosed herein, the apparatus, the method, or the non-transitory computer readable medium can include modules, steps, or executable instructions for removing one or more sub-polygons corresponding to a particular polygon from the index system.

In any one of the embodiments disclosed herein, the apparatus, the method, or the non-transitory computer readable medium can include modules, steps, or executable instructions for removing one or more sub-polygons from the plurality of sub-polygons to provide a reduced set of sub-polygons and generating the index system from the reduced set of sub-polygons, thereby reducing the size of the index system.

In any one of the embodiments disclosed herein, the apparatus, the method, or the non-transitory computer readable medium can include modules, steps, or executable instructions for receiving a second index system from another computing device and merging the first index system and the second index system by considering an overlap of sub-polygons corresponding to the first index system and the second index system.

In any one of the embodiments disclosed herein, the apparatus, the method, or the non-transitory computer readable medium can include modules, steps, or executable instructions for providing the index system to a computing device so that the computing device can use the index system to serve location queries.

In general, in an aspect, embodiments of the disclosed subject matter can include an apparatus, a method, and a non-transitory computer readable medium. The apparatus, the method, or the non-transitory computer readable medium can include modules, steps, or executable instructions for receiving a location query from the client device, wherein the location query includes a location identifier associated with the client device, determining a query identifier corresponding to the location identifier, comparing the query identifier with the index system to determine that the location identifier provided by the client device is within the region of interest, and providing a service associated with the region of interest to the client device over the communication network.

In any one of the embodiments disclosed herein, the unique identifiers and the query identifier can include geohash codes.

In any one of the embodiments disclosed herein, the apparatus, the method, or the non-transitory computer readable medium can include modules, steps, or executable instructions for determining that the query identifier is represented in the index system and that the location identifier provided by the client device is within the region of interest In any one of the embodiments disclosed herein, the apparatus, the method, or the non-transitory computer readable medium can include modules, steps, or executable instructions for comparing a first sequence of bits of the query identifier, corresponding to a lower-precision sub-polygon, to the index system before comparing a second sequence of bits of the query identifier, corresponding to a higher-precision sub-polygon.

In any one of the embodiments disclosed herein, wherein the index system comprises an index tree, and the apparatus, the method, or the non-transitory computer readable medium further includes modules, steps, or executable instructions for determining that the query identifier is within the region of interest when the first sequence of bits of the query identifier match a first index of the index system corresponding to a leaf node of the index system.

In any one of the embodiments disclosed herein, the apparatus, the method, or the non-transitory computer readable medium can include modules, steps, or executable instructions for retrieving, from the index system, a polygon identifier associated with the query identifier, determining a group identifier associated with the polygon identifier, and providing the service associated with the campaign identifier to the client device over the communication network.

In any one of the embodiments disclosed herein, the apparatus, the method, or the non-transitory computer readable medium can include modules, steps, or executable instructions for retrieving, from the index system, a polygon identifier associated with the query identifier, and providing data associated with the polygon identifier to the client device over the communication network.

DESCRIPTION OF THE FIGURES

Various objects, features, and advantages of the present disclosure can be more fully appreciated with reference to the following detailed description when considered in connection with the following drawings, in which like reference numerals identify like elements. The following drawings are for the purpose of illustration only and are not intended to be limiting of the disclosed subject matter, the scope of which is set forth in the claims that follow.

FIGS. 4A-4B illustrate properties of geohash codes and tiles in accordance with some embodiments.

DETAILED DESCRIPTIONS

Figure 1:
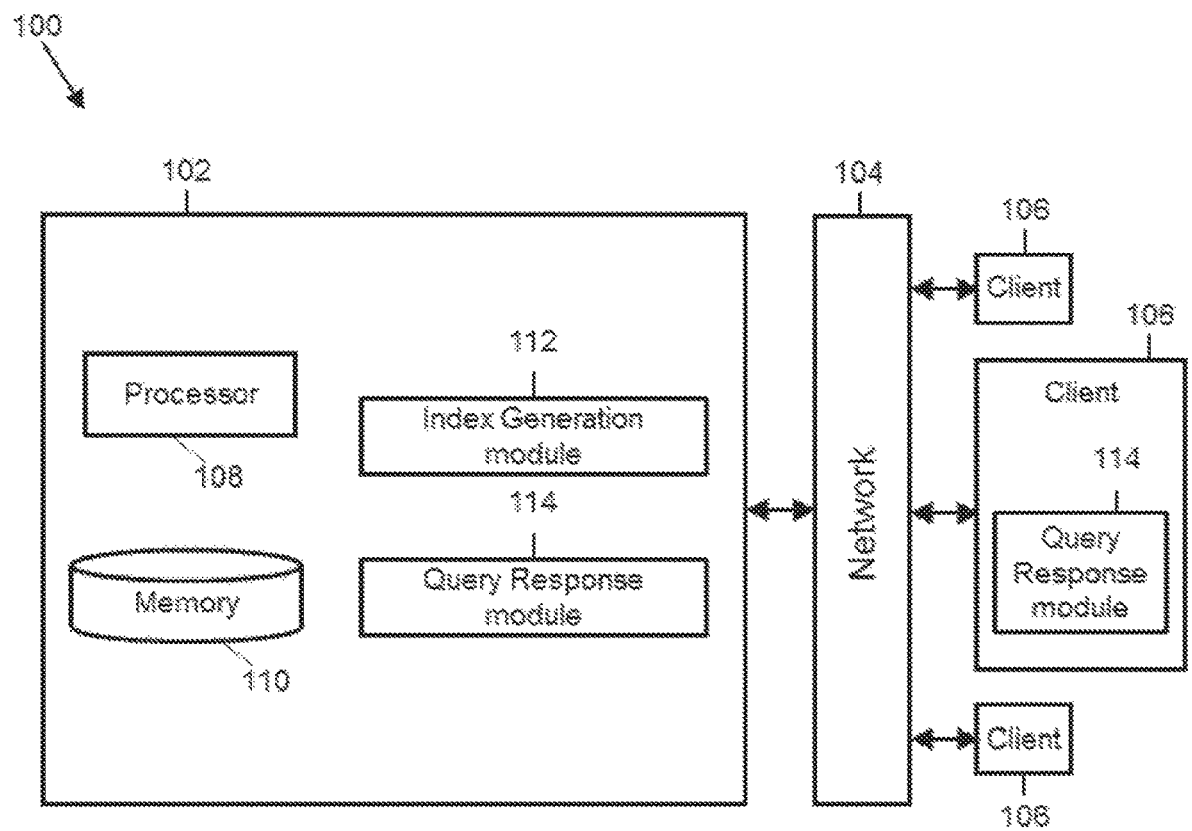
FIG. 1 illustrates a diagram of a location query system in accordance with some embodiments.

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

The disclosed apparatus, systems, and methods relate to a location query mechanism that can efficiently determine whether a target entity is located within a region of interest (ROI). At a high level, the location query mechanism can be configured to represent a ROI using one or more polygons. The location query mechanism can, in turn, divide (e.g., tessellate) the one or more polygons into sub-polygons. Subsequently, the location query mechanism can use the sub-polygons to build an index system that can efficiently determine whether a particular location is within any of the sub-polygons. Therefore, when a computing device queries whether a particular location is within the region of interest, the location query mechanism can use the index system to determine whether the particular location is within any of the sub-polygons.

In some embodiments, the disclosed location query mechanism can include three stages. The first stage includes representing the ROI with one or more polygons. The second stage includes the generation of an index system for the one or more polygons. The index system generation process can involve receiving location descriptions of the one or more polygons and generating an efficiently queryable data structure for the location descriptions. The index system generation process can be performed off-line using a single computer or a cluster of computers. Therefore, the index system generation process may not interfere with an on-line (e.g., real-time) or high throughput (e.g. batch or real-time) operation of the location query response mechanism, as disclosed below.

The third, stage includes a real-time query response mechanism for responding to location queries. For example, when the query response mechanism receives a location query, including a location identifier, from a client device, the query response mechanism can search the index system to determine whether the location identifier is associated with any of the polygons represented by the index system. If the location identifier is associated with one of the polygons, the query response mechanism can indicate the one or more polygons associated with the location identifier.

The disclosed location query mechanism is substantially more efficient compared to existing location query mechanisms. The disclosed location query mechanism can enable a server to serve queries in sub milliseconds and theoretically enable the processing of tens of thousands of queries per second per processing core.

The disclosed location query mechanism can be useful in the advertisement industry. For example, the advertisement display system on a mobile device can be configured to update and send the mobile device's geographic location information to an advertisement server. The advertisement server, in turn, can use the disclosed location query mechanism to identify relevant advertising campaigns related to the device's location, and use this information to serve highly contextual, location sensitive advertisement to the mobile device. Therefore, the query response mechanism can cause an advertisement to be sent to a target entity associated with the location identifier.

The disclosed location query mechanism can also be useful in mobile applications services. For example, sports-related mobile applications may provide a different interface on a user interface (e.g., a screen) of a mobile device depending on the device's location. For instance, a mobile device can update and send its geographic location information to the mobile application server. The mobile application server, in turn, can use the disclosed location query mechanism to identify relevant services related to the device's location, and use this information to serve highly contextual, location sensitive service to the mobile device.

The disclosed location query mechanism can also be useful in a variety of applications that processes data with location information. For example, processing data with location information from, for example, user logs, location tagged social network information (e.g. a stream of tweets), or similar data can benefit from additional contextual information such as whether the stated location is in a region of interest such as a shopping mall.

FIG. 1 illustrates a diagram of a location query system in accordance with some embodiments. The system 100 includes a host server 102, a communication network 104, and one or more client devices 106. The host server 102 can include a processor 108, a memory device 110, an index generation module 112, and a query response module 114.

The host server 102 and the one or more client devices 106 can communicate via the communication network 104.

The communication network 104 can include the Internet, a cellular network, a telephone network, a computer network, a packet switching network, a line switching network, a local area network (LAN), a wide area network (WAN), a global area network, or any number of private networks currently referred to as an Intranet, and/or any other network or combination of networks that can accommodate data communication. Such networks may be implemented with any number of hardware and software components, transmission media and network protocols. Although FIG. 1 represents the network 104 as a single network, the network 104 can include multiple interconnected networks listed above.

A client 106 can include a desktop computer, a mobile computer, a tablet computer, a cellular device, or any other computing devices having a processor and memory. The client 106 can communicate with the host server 102 via the communication network 104. Although FIG. 1 represents the host server 102 as a single server, the host server 102 can include more than one server and can be part of a cloud-computing platform.

The processor 108 of the host server 102 can be implemented in hardware. The processor 108 can include an application specific integrated circuit (ASIC), programmable logic array (PLA), digital signal processor (DSP), field programmable gate array (FPGA), or any other integrated circuit. The processor 108 can also include one or more of any other applicable processors, such as a system-on-a-chip that combines one or more of a CPU, an application processor, and flash memory, or a reduced instruction set computing (RISC) processor. The memory device 110 of the processor 108 can include a computer readable medium, flash memory, a magnetic disk drive, an optical drive, a programmable read-only memory (PROM), and/or a read-only memory (ROM).

The index generation module 112 can be configured to generate an index system for one or more polygons. The index generation module 112 can maintain the generated index in the memory device 110 or provide the generated index to the query response module 114. The query response module 114 can be configured to respond to location queries in real-time. In some cases, the query response module 114 can reside in the host server 102. In other cases, the query response module 114 can reside in the client device 106. Also, the index generation module 112 and the query response module 114 need not reside on the same device.

In some embodiments, the index generation module 112 and/or the query response module 114 can be implemented in software stored in the memory device 110. The software stored in the memory device 110 can run on the processor 108 capable of executing computer instructions or computer code.

In some embodiments, the index generation module 112 and/or the query response module 114 can be implemented in hardware using an ASIC, PLA, DSP, FPGA, or any other integrated circuit. In some embodiments, the index generation module 112 and the query response module 114 can both be implemented on the same integrated circuit, such as ASIC, PLA, DSP, or FPGA, thereby forming a system on chip.

The index generation ("IG") module 112 can be configured to use one or more location identifiers to represent a polygon. Location identifiers can be associated with any coordinate systems or hashing systems representing a region. More particularly, a polygon can be tessellated into a set of tiles (also referred to as sub-polygons). Each sub-polygon can cover geographic sub-region based on the desired level of precision, and can be associated with a location identifier. For example, a location identifier can include geohash code associated with a region of a predetermined precision, or size. A region associated with a location identifier can be referred to as a tile or a sub-polygon. For example, a region associated with a geohash code can be referred to as a geohash tile or a geohash sub-polygon.

In some embodiments, location identifiers can be hierarchically organized. For example, certain types of location identifiers, such as geohash codes, can use a 32 subdivision system. Under the 32 subdivision system, a geohash code can be associated with a region, that are covered by 32 other geohash codes, and each of the 32 other geohash codes can, in turn, be associated with a region that are covered by a plurality of other geohash codes. Therefore, the geohash codes can be represented as a tree. The hierarchy of the location identifiers can be determined based on a variety of factors, for example, a number of bits used to represent a location identifier, a depth of the tree representing the hierarchy of location identifiers, and/or a breadth of the tree representing the hierarchy of location identifiers.

Figure 2:
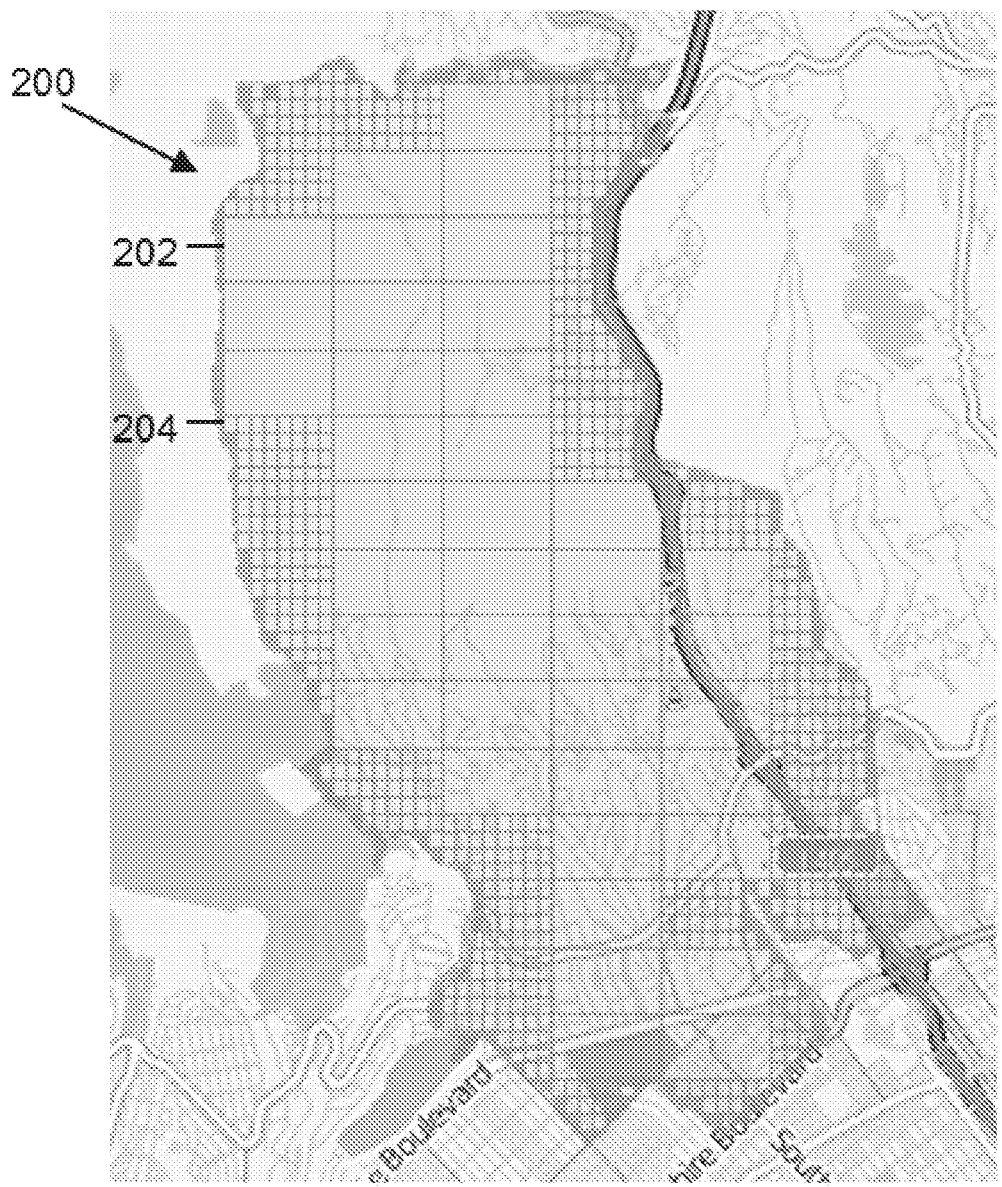
FIGS. 2-3 illustrate how location identifiers can be used to represent a region of interest in accordance with some embodiments.

FIG. 2 illustrates how location identifiers can be used to represent a polygon in accordance with some embodiments. FIG. 2 includes a region of interest, which can include one or more polygons 200. A polygon can refer a geographic demarcation of an area. In some embodiments, the polygon can be represented graphically on a map; in other embodiments, the polygon can be represented by a plurality of subpolygons associated with location identifiers. For example, the polygon can be represented by a plurality of geohash tiles, including a first geohash tile 202 and a second geohash tile 204, each of which can be associated with a geohash code.

In some embodiments, a geohash tile can have one of several predetermined sizes. For example, the first geohash tile 202 is larger than the second geohash tile 204. As shown, smaller, higher precision, geohash tiles are used near the periphery of the polygon and larger, lower precision, geohash tiles are used in the interior of the polygon. The area of the polygon 200 is taken to be the collective area defined by all the tiles that form the polygon.

Figure 3:
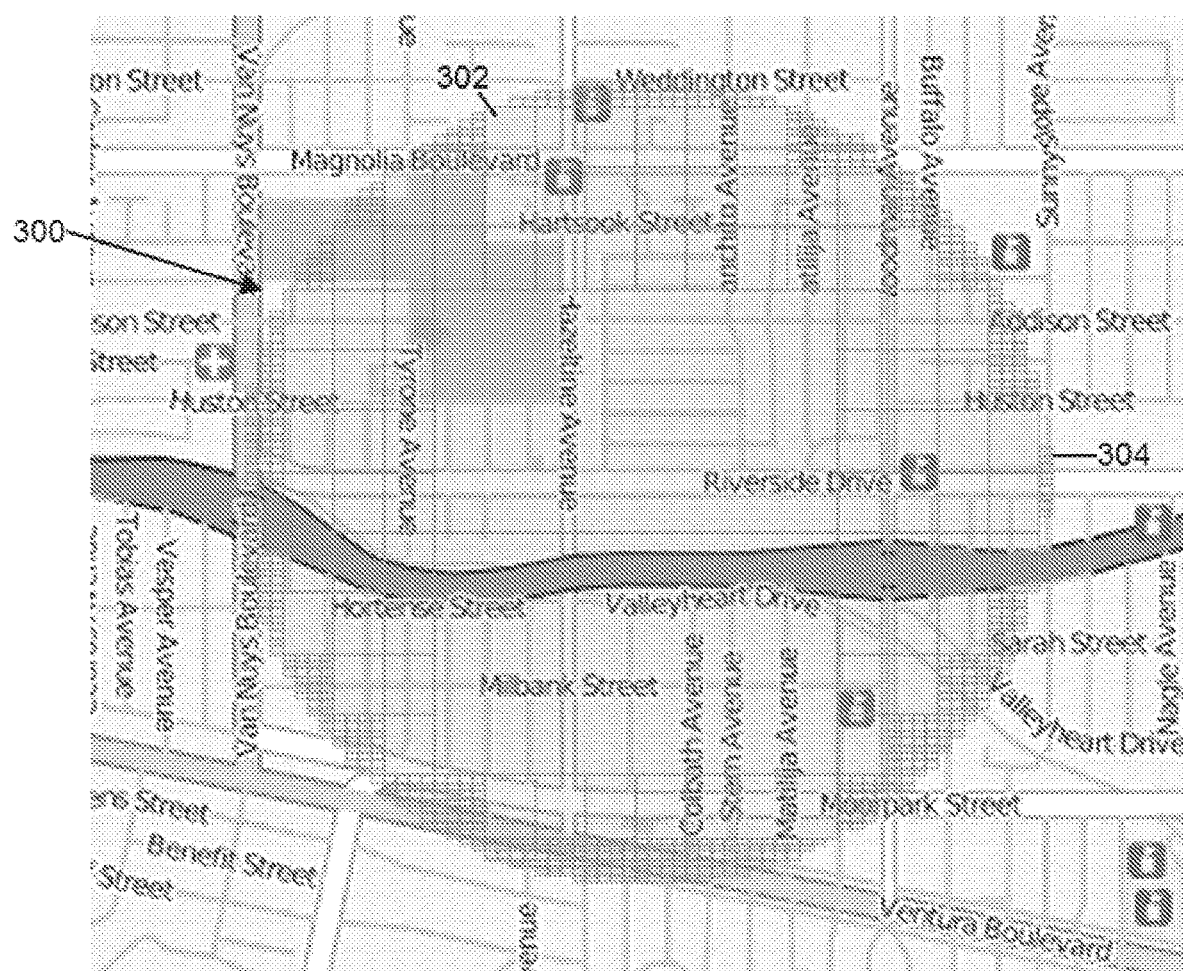

FIG. 3 also illustrates how location identifiers can be used to represent a polygon in accordance with some embodiments. FIG. 3 includes a region of interest, which is a polygon 300 having a circular shape surrounding a point of interest at the center of the polygon 300. As with FIG. 2, the polygon 300 is represented by a plurality of subpolygons associated with location identifiers. For example, the polygon 300 is represented by a plurality of geohash tiles, including a first geohash tile 302 and a second geohash tile 304, and each geohash tile can be associated with one of several predetermined sizes. As with FIG. 2, smaller, higher precision, geohash tiles are used to define the periphery of the polygon 300 and larger, lower resolution, geohash tiles are used in the interior of the polygon 300. Again, the area of the polygon 300 is taken to be the collective area defined by all geohash tiles that form the polygon 300.

In some embodiments, the IG module 112 can be configured to identify one or more sub-polygons (e.g., geohash tiles) that collectively represent a region comprising a plurality of polygons. The sub-polygon identification for a region can involve two steps. The first step of the sub-polygon identification can include receiving one or more polygons associated with a region. These polygons can be as simple as a coordinate (representing the location of a point-of-interest) enclosed by a circle of a given radius, or more complex shape, like a multi-edged polygon representing a desired geographical area, or a point-of-interest, such as an airport.

The second step of the sub-polygon identification can include generating one or more sub-regions that are enclosed by the region (e.g., assembled polygons). For example, a geohash tile can be defined on a coordinate system, and can be considered a sub-region defined on that coordinate system. The IG module 112 can be configured to find sub-regions (e.g., geohash tiles), defined on the geohash coordinate system, that are entirely contained within the one of the assembled polygons. The IG module 112 can be configured to favor a region representation that uses larger sub-regions than smaller sub-regions so that a polygon can be represented with a small number of sub-regions.

The IG module 112 can be configured to identify such sub-polygons in an iterative manner. For example, as a first step, the IG module 112 can be configured to construct a set of geohash tiles having an identical, largest size such that this set of geohash tiles encompasses one or more polygons in the region of interest. Subsequently, the IG module 112 can be configured to test each geohash tile in the set of geohash tiles to determine if the particular geohash tile is completely within the associated polygon (e.g., without crossing the boundary of the associated polygon). If the particular geohash tile is completely within the polygon, the IG module 112 can keep the geohash tile. If the particular geohash tile is completely outside of the polygon, the IG module 112 can discard the particular geohash tile. If the particular geohash tile is partially within the polygon (e.g. crossing the boundary of the associated polygon) the IG module 112 can break the particular geohash tile into a plurality of geohash sub-tiles.

Subsequently, the IG module 112 repeats the above process using the geohash sub-tiles. For example, the IG module 112 can determine, for each of the plurality of geohash sub-tiles, whether the sub-tile is completely within the associated polygon. If the sub-tile is completely within the polygon, the IG module 112 can keep the geohash sub-tile. If the sub-tile is completely outside of the polygon, the G1 module 112 can discard the geohash sub-tile. If the sub-tile is partially within the polygon, the IG module 112 can further break the geohash sub-tile into a plurality of smaller tiles and repeat this process. The IG module 112 can perform this operation iteratively for each geohash tile to see if it 'fits' (i.e. does not intersect) the polygon, and if not, it recursively decreases the size of the geohash tile (e.g., increases the precision) to achieve a fit.

In some embodiments, there is a maximum level of precision defined for the geohash tiles (e.g., the smallest geohash tile that can be used to model the polygon), thereby providing a proper balance between the number of tiles and the level of fit for producing a good index. If a tile is reduced to the minimum size (e.g., the maximum precision) but still intersects the desired polygon, it is considered to be inside the polygon and included in the index.

In some embodiments, a location identifier associated with a sub-polygon can include a geohash code (e.g., a geohash code of the type defined in http://geohash.org/). A geohash code is a hierarchical spatial data structure that subdivides a region into tiles. A geohash code can include a sequence of bits that substantially uniquely identifies a location. In some cases, the sequence of bits can be encoded or can represent a sequence of characters. An example of a geohash code is a character sequence, "8z4fg." In some embodiments, a set of geohash codes can exhibit hierarchical characteristics. For example, shorter geohash codes can be associated with a lower precision (e.g., shorter geohash codes are associated with larger geographic areas) whereas longer geohash codes can be associated with a higher precision (e.g., longer geohash codes are associated with smaller geographic areas). As a consequence of the gradual precision degradation based on the number of characters, nearby locations are often associated with similar prefixes. In some embodiments, the geohash codes that begin with the same characters can refer to the same geographic area. Two geohash codes that share a large number of prefix characters are associated with two locations that are in proximity.

FIGS. 4A-4B illustrate properties of geohash codes and tiles in accordance with some embodiments. FIG. 4A shows a geohash tile 402 corresponding to a geohash code "8z4fg." The geohash tile 402 is centered on a geographical coordinate denoted by an X. X could represent any geographical coordinate, for example, latitude=42 degrees North and longitude=71 degrees West. FIG. 4B shows four geohash tiles 404A-404D. FIG. 4B also shows the geohash code associated with each tile (e.g., "8z4fgf" is the geohash code for time 404A). The four geohash tiles 404A-404D collectively cover the same area as the geohash tile 402. In fact, the four geohash tiles 404A-404D represent four sub-divisions of the geohash tile 402. The X at the center of FIG. 4B represents the same geographical coordinate as the X shown in FIG. 4A.

Because the four geohash tiles 404A-404D represent four sub-divisions of the geohash tile 402, the geohash codes for the four geohash tiles 404A-404D can be longer than the geohash code for the geohash tile 402, and the geohash codes for the four geohash tiles 404A-404D can share characters with the geohash code for the geohash tile 402. For example, the geohash codes of the geohash tiles 404A-404D can be each six characters long, whereas the geohash code the geohash tile 402 can be five characters long.

Furthermore, all geohash codes shown in FIG. 4B begin with the five character sequence "8z4fg", which is identical to the geohash code of the geohash tile 402. This illustrates that geohash codes that begin with the same sequence relate to the same geographical area. Since the geohash codes of the geohash tiles 404A-404D begin with the same sequence as the geohash code of the geohash tile 402, the geohash codes of the geohash tiles 404A-404D are associated with tiles that fall within the geohash tile 402. Generally, if a geohash code corresponds to an original tile, then a concatenation of the geohash code with another character refers to a sub-tile within the original tile, as shown by the example of FIGS. 4A-4B.

In summary, the use of hierarchical encoding schemes for location identifiers, such as geohash codes, offer useful properties, such as an arbitrary precision (e.g., by adding as many characters as needed), a locality (e.g., similar prefixes are associated with nearby positions), and the ability to reduce precision (or increase an area coverage) by removing one or more characters from the end of the geohash code while still maintaining the spatial locality. These properties allow the disclosed indexing system to limit the amount of high precision indexing to only areas that require that level of detail.

Figure 5:
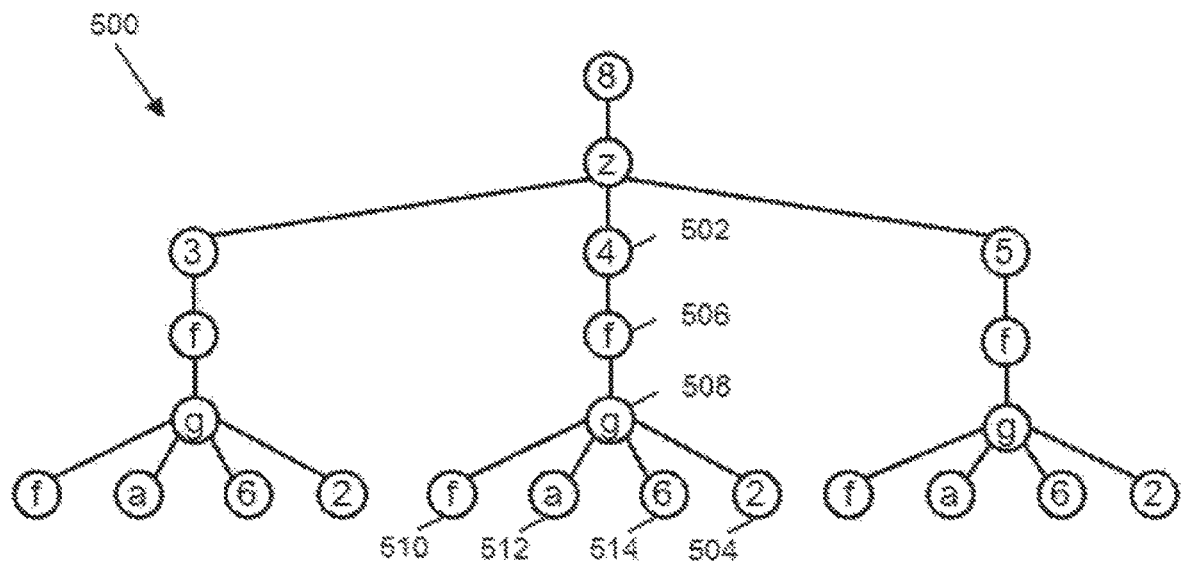
FIG. 5 illustrates a tree of geohash codes in accordance with some embodiments.

In some embodiments, a collection of location identifiers, such as geohash codes (and their associated tiles) can be represented in a tree structure. FIG. 5 illustrates a tree of geohash codes in accordance with some embodiments. The tree of geohash codes (also referred to as a geohash tree) 500 relates to the geohash tiles illustrates in FIGS. 4A-4B. A geohash tree 500 can include branch nodes, such as a node 502, and leaf nodes, such as a node 504. A node is a branch node if it connects to a lower node (either a lower branch node or a leaf node). For example, the branch node 502 connects to another branch node 506. A node is a leaf node if it does not connect to any lower nodes. For example, the node 504 is a leaf node because it does not connect to any lower nodes. Some of the nodes in FIG. 5 can be associated with a geohash tile in FIG. 4. For example, the node 508 can be associated with the geohash tile in FIG. 4A. As another example, the nodes 510, 512, 514, and 504 can be associated with the geohash tiles 404A, 404B, 404C, and 404D, respectively.

Figure 6A:
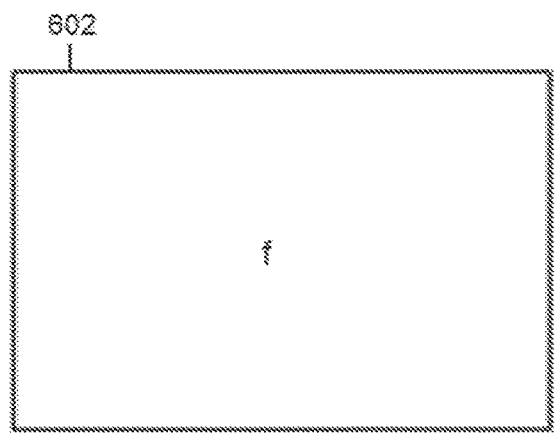
FIGS. 6A-6D illustrate two collections of geohash tiles and the associated tree in accordance with some embodiments.
Figure 6B:
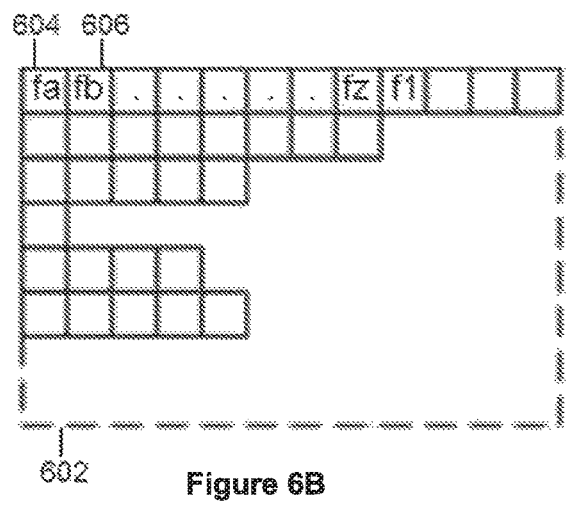
Figure 6C:
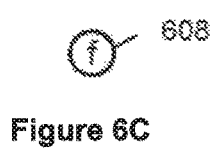
Figure 6D:
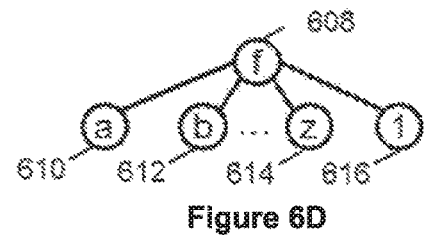

FIGS. 6A-6D illustrate two collections of geohash tiles and the associated tree in accordance with some embodiments. FIG. 6A shows a single "large" geohash tile 602, whereas FIG. 6B shows a set of smaller geohash tiles, including tiles 604, 606. In FIG. 6B, the dashed periphery is the same size as that of the large tile 602 shown in FIG. 6A. FIG. 6B represents a case in which the large tile 602 does not fit a polygon well and so was split up into smaller tiles, including 604, 606, as previously discussed with respect to FIGS. 2-3. The single large tile 602 can be represented as a tree structure that includes only one single leaf node 608, as illustrated in FIG. 6C. On the other hand, the set of tiles shown in FIG. 6B can be represented as a tree structure that includes both branch node 608 and leaf nodes 610, 612, 614, 616, as illustrated in FIG. 6D.

Once the IG module 112 defines a polygon that describes a region of interest associated with an advertising campaign, the IG module 112 can generate one or more tree structures that describe the collection of geohash tiles in the polygon. The IG module 112 can repeat this process for each set of geohash tiles in each polygon of interest.

In some embodiments, the IG module 112 can merge multiple geohash trees so that multiple geohash trees can be represented using a compact representation. This feature can be useful when two or more computers are configured to generate multiple geohash trees in a distributed manner, for example, simultaneously. At a high level, when two polygons have intersecting geohash tiles, a lower precision geohash tile that encompasses other higher precision geohash tiles can be marked as a leaf, while the higher precision geohash tiles are discarded from the geohash tree. The net result is an optimized set of different precision geohash tiles that can be used to represent the set of disjoint polygons that make up a specified geo-targeted advertising campaign. This merging operation does not necessarily lose precision information because, if regions not covered by the higher precision geohash tiles are within the polygon according to a first geohash tree, there is no need to differentiate regions in the higher precision geohash tiles and regions outside of the higher precision geohash tiles.

Figure 7A:
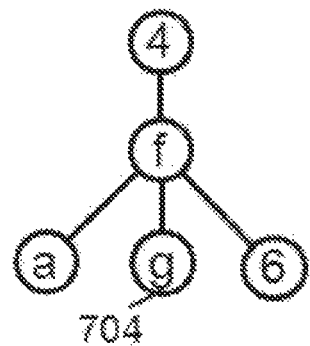
FIGS. 7A-7C illustrate a merging of the trees in accordance with some embodiments.
Figure 7B:
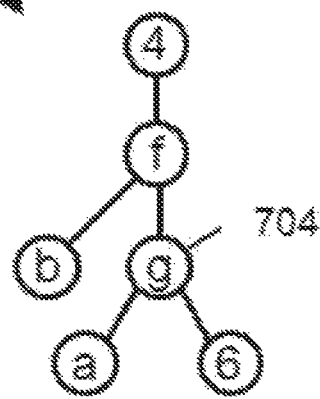
Figure 7C:
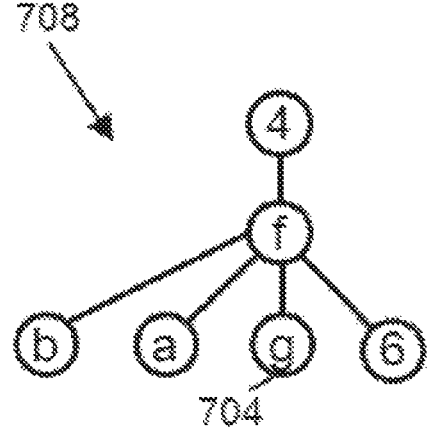

FIGS. 7A-7C illustrate a merging of the trees in accordance with some embodiments. FIGS. 7A-7B illustrate two trees. The first tree 702 corresponds to a first polygon in the region of interest; the second tree 706 corresponds to a second polygon in the region of interest. The first tree 702 includes a geohash tile "4fg" 704, and the second tree 706 includes subtiles of the geohash tile 704. Therefore, the region of interest includes both the geohash tile "4fg" 704, as indicated by the first tree 702, and the subtiles of the geohash tile 704, as indicated by the second tree 706. The IG module 112 can merge these two trees to generate a third tree 708 in which the subtiles of the geohash tile 704 is subsumed by the geohash node 704. Therefore, the third tree 708 can represent the region of interest having both the first polygon and the second polygon with a less number of nodes in the tree compared to the combined number of nodes in the first tree 702 and the second tree 706.

Subsequently, the IG module 112 can use the merged geohash tree to generate an index system for the geohash tiles. The IG module 112 can generate the index system by walking down the geohash tree from the top branch node to the leaf nodes in hierarchical order.

In some embodiments, the IG module 112 can reduce the resolution of a geohash tree to reduce the size of the geohash tree and to increase the query speed of the index system associated with the geohash tree. For example, referring to FIG. 7B, the IG module 112 can truncate, in the geohash tree 706, all nodes below the "g" node 704. This way, the IG module 112 can reduce the size of the geohash tree 706 at the expense of reducing the resolution of the polygon represented by the geohash tree 706.

Figure 8A:
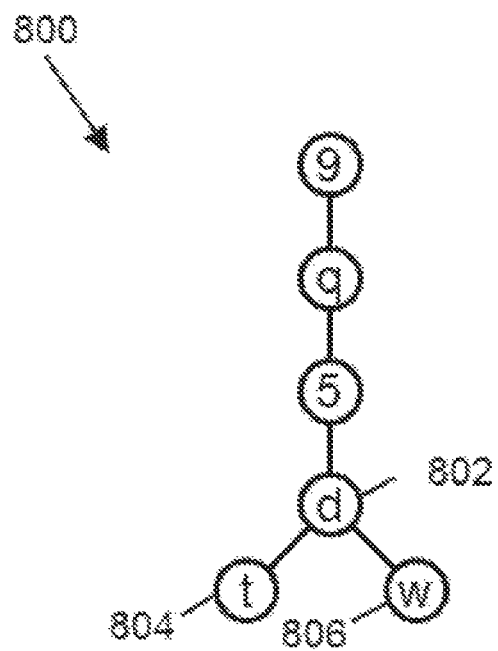
FIGS. 8A-8B illustrate a mechanism for generating the geohash tile index system in accordance with some embodiments.
Figure 8B:
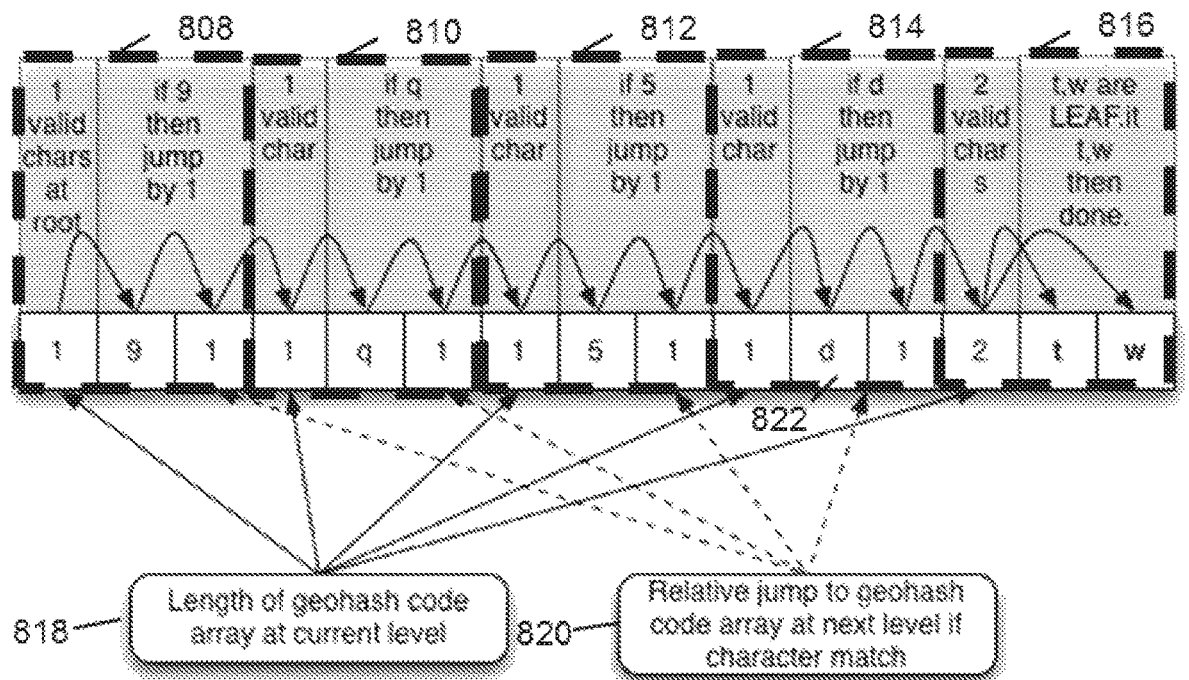

FIGS. 8A-8B illustrate a mechanism for generating the geohash tile index system in accordance with some embodiments. FIG. 8A illustrates a geohash tree 800 associated with three geohash tiles: a first geohash tile 802 with a geohash code "9q5d", a second geohash tile 804 with a geohash code "9q5dt", and a third geohash tile 806 with a geohash code "9q5dw." The IG module 112 can walk down the geohash tree 800 recursively to generate the geohash index system, as illustrated in FIG. 8B. The IG module 112 can start from the top (e.g., the root node) of the tree 800, and, at each stage (e.g., each level of the tree or a geodesic distance level from the root node), emit an index corresponding to the value of the node at that stage.

For example, in the first step, the IG module 112 can generate "9" as an index, since "9" is the value of the root node of the tree 800. Then the IG module 112 can walk down to the next node (e.g., the next level) and generate "q" as an index. Then the IG module 112 can walk down to the next node and generate "5" as an index. Then the IG module 112 can walk down to the next node and generate "d" as an index. Then the G1 module 112 can walk down to the next node and generate "t" and "w" as indices associated with that level. In some embodiments, the IG module 112 can walk the tree in a depth-first-search manner; in other embodiments, the IG module 112 can walk the tree in a breadth-first-search manner.

FIG. 8B illustrates the generated geohash index system based on the geohash tree of FIG. 8A. In some embodiments, the geohash index system can be represented using a flat hierarchical data representation. In some cases, the flat hierarchical data representation can include a jump table. The jump table is, in effect, an unrolled representation (e.g., rasterized representation) of the geohash tree 800. The unrolled representation can be a single-layer data structure that can expedite the search for relevant information. In other cases, the flat hierarchical data representation can include a skip list.

In some embodiments, the geohash index system can be represented as a plurality of data structure nodes 808-816. Each data structure node can correspond to a set of nodes at the same level (e.g., the same distance from the root node) in the corresponding tree. For example, all nodes in level 3 (e.g., the number of shortest-path edges between the root node and a candidate node is 3), can be represented as a data structure node 814 having three values: the length of the geohash nodes in the tree at the current level 818, the value(s) 822 of the geohash nodes in the tree at the current level 818, and the number of "jumps" 820 to be performed to reach the data structure corresponding to the geohash nodes in the tree at the next level.

An alternative approach to encoding the data is to populate a probabilistic data structure, such as a bloom filter. Both approaches have merit and offer different tradeoffs. The flattened index approach described above has the characteristics of giving a more deterministic answer to the question, but at a potentially increased memory footprint when compared to the bloom filter approach. The bloom filter, on the other hand, is potentially more compact and would not require merging tree structures but has a probabilistic margin of error and thus can return false positives and also has a greater impact of the processor's ability to prefetch memory pages.

An alternative approach to encoding the data is to use a hash table.

Once the IG module 112 generates the geohash index system, the IG module 112 can store the geohash index system in the memory device 110. Subsequently, the query response ("QR") module 114 can use the stored geohash index system to serve location queries from clients 106.

Figure 9:
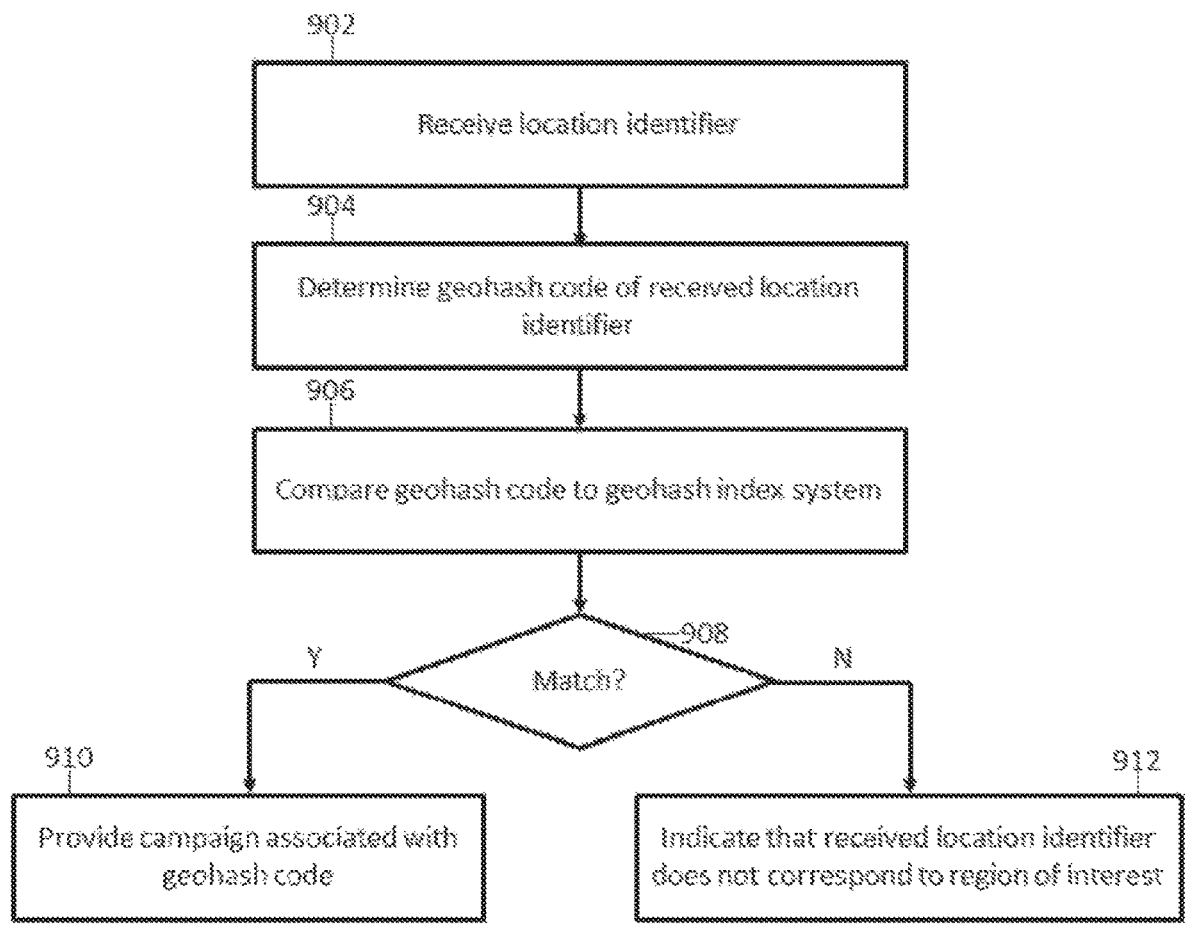
FIG. 9 illustrates a process for serving location queries in accordance with some embodiments.

FIG. 9 illustrates a process used by the QR module 114 for serving location queries in accordance with some embodiments. In step 902, the QR module 114 can be configured to receive a location query from a client 106, requesting the QR module 114 to determine whether the client 106 is within a polygon. To this end, the location query can include the location identifier of the client 106, indicating a location of the client 106. The location identifier can take the form of a coordinate, for example, (longitude, latitude) pair. The client 106 can determine its location identifier based on a location determination mechanism. The location determination mechanism can include a Global Positioning System (GPS) technique, a cellular tower triangulation technique, an Internet Protocol (IP) address-based location determination technique, and/or any other suitable techniques for determining the location of the client 106.

In step 904, the QR module 114 can be configured to convert the location identifier into a geohash code. In some embodiments, the QR module 114 can be configured to generate the highest-precision query geohash code corresponding to the location identifier (e.g., a geohash code that most precisely identifies a location associated with the location identifier.) In some embodiments, the precision of the query geohash code can be higher than the maximum precision level of geohash codes summarized by the geohash index system.

In step 906, the QR module 114 can compare the query geohash code to the geohash index system, and in step 908, the QR module 114 can determine, based on the comparison, whether the received location identifier is within a polygon modeled by the geohash index system. If the received location identifier is within the polygon, then in step 910, the QR module 114 can provide the identifier of the polygon that matched to the location identifier (e.g., so as to match the received location identifier with a particular advertising campaign). If the received location identifier is not within the polygon, then in step 912, the QR module 114 can indicate that the received location identifier does not correspond to the polygon. In some cases, in step 910, the host server 102 can cause an advertisement associated with that polygon to be sent to the client 106. In some embodiments, this system allows such processing for multiple location identifier received from multiple clients 106 to be performed quickly to determine whether the location identifiers provided by the client devices 106 are in any of the polygons.

In some embodiments, in step 908, the QR module 114 can determine whether the received location identifier is within an polygon modeled by the geohash index system by comparing the query geohash code of the location identifier to the geohash index system. In some cases, the QR module 114 can be configured to compare characters corresponding to larger geohash tiles (e.g., lower-precision geohash tiles) before comparing characters corresponding to smaller geohash tiles (e.g., higher-precision geohash tiles.) For example, the QR module 114 can retrieve the first character of the query geohash code and compare the first character to the root node (e.g., the highest node) in the geohash index system, modeled by the jump table and offsets. If the first character of the query geohash code matches one of the root nodes in the geohash index system, the QR module 114 can determine if the one of the root nodes represents a leaf node. If so, the QR module 114 can indicate that the query geohash code is associated with a polygon modeled by the index system and move to step 910. If the one of the root nodes does not represent a leaf node, the QR module 114 can move to the next character (e.g., a character adjacent to the first character), and compare the new character with values in one or more nodes coupled to the one of the root nodes (e.g., one or more children of the one of the root nodes.)

This process is iterated until (1) the QR module 114 does not find a match between a character and a value of the nodes in the level (e.g., the depth level of the geohash tree) corresponding to the character, or (2) the QR module 114 reaches the leaf node. If, at any point in walking down the geohash tree, the QR module 114 reaches a node where the character of the query geohash code does not match the values in the geohash index system, then the QR module 114 can declare a no-match and proceed to step 912. If the QR module 114 reaches the leaf node and the value of the leaf node matches a corresponding character in the query geohash code, then the QR module 114 can indicate a match between the query geohash code and the geohash index system, and proceed to step 910. If the QR module 114 reaches the leaf node and the value of the leaf node does not match a corresponding character in the query geohash code, then the QR module 114 can indicate a no-match between the query geohash code and the geohash index system and proceed to step 912.

Figure 10:
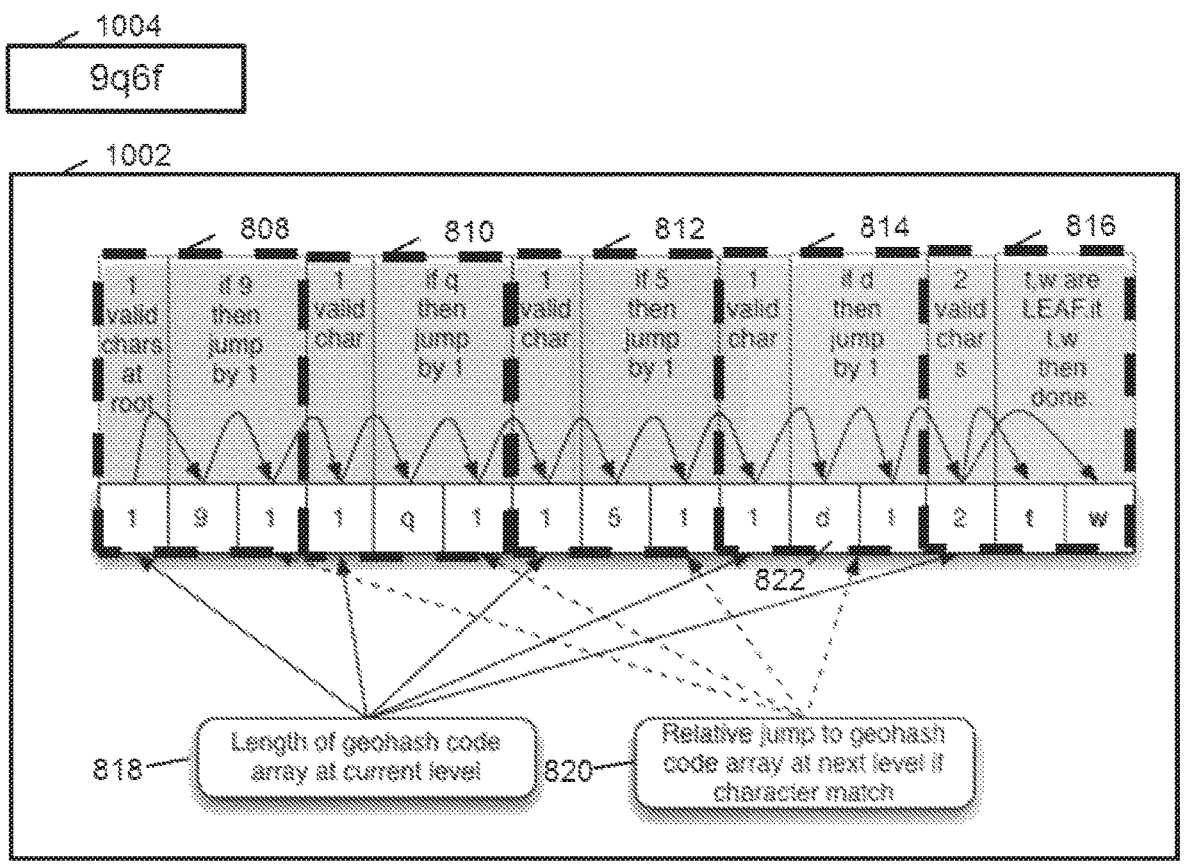
FIG. 10 illustrates a process for comparing a query geohash code to a geohash index system in accordance with some embodiments.

FIG. 10 illustrates a process for comparing a query geohash code to a geohash index system in accordance with some embodiments. In this example, the QR module 114 can communicate with the geohash index system 1002 to determine whether a query geohash code "9q5f" 1004 is within a polygon modeled by the geohash index system 1002. In the first step, the QR module 114 can take the first character "9" of the query geohash code 1004 and compare it against the root data structure 808 of the geohash index system 1002. Since the value of the first character "9" matches the value of the root data structure 808, the QR module 114 can move onto the second data structure 810. In the second step, the QR module 114 can take the second character "q" of the query geohash code 1004 and compare against the second data structure 810 of the geohash index system 1002. Since the value of the second character "q" matches the value of the second data structure 810, the QR module 114 can move onto the third data structure 812.

In the third step, the QR module 114 can take the third character "6" of the query geohash code 1004 and compare against the third data structure 812 of the geohash index system 1002. Since the value of the third character "6" does not match the value of the third data structure 812, the QR module 114 can determine that the query geohash code 1004 is not within the polygon modeled by the geohash index system 1002.

If, instead, the query geohash code is "9q5dt", then the QR module 114 will find a match at each data structure node in the geohash index system 1002, and therefore, the QR module 114 would indicate that the location corresponding to the query geohash code is "9q5dt" is within the polygon modeled by the geohash index system 1002.

Figure 11A:
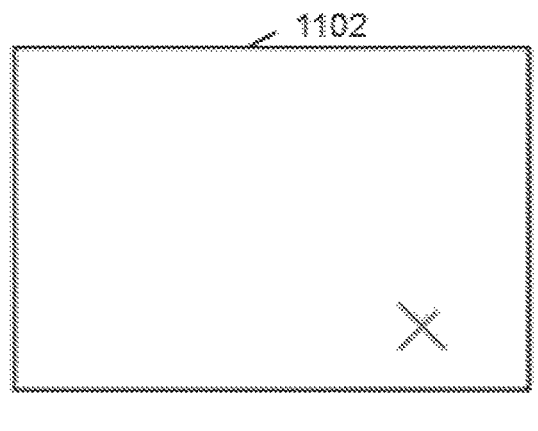
FIGS. 11A-11B illustrates a process for comparing a geohash code and a geohash index system in accordance with some embodiments.

In some cases, a single comparison between the query geohash code and the geohash tree can be sufficient reveal whether the receive location identifier is within a polygon. For example, if the query geohash code of the location identifier lies within a tree having only a single leaf node, then the comparison of the first character of the query geohash code to the tree structure can reveal a hit and it will be known that the client 106 is located within an area of interest. FIG. 11A illustrates a scenario in which a single comparison can reveal a hit in accordance with some embodiments. In FIG. 11A, the rectangle 1102 corresponds to a single geohash tile, which is represented as a tree structure containing only a single leaf, as illustrated in FIG. 6C. The X in FIG. 11A represents the location of the client 106 from which the location identifier is received. Due to the nature of query geohash codes, the first character of the client's geohash code is identical to the first character of the geohash tile 1102. Therefore, a comparison of the first character of the client's query geohash code to the top level of the geohash tree can reveal a match.

Figure 11B:
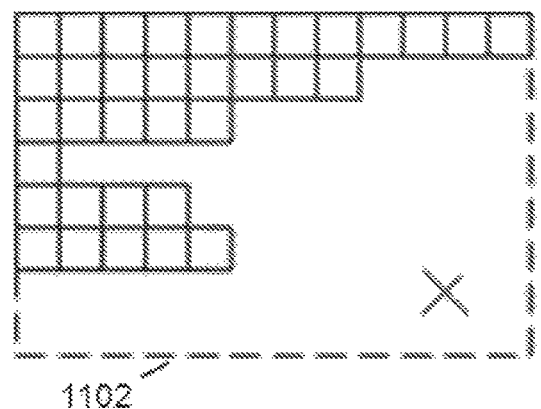

In some cases, multiple comparisons between the query geohash code and the geohash tree may be needed to reveal whether the receive location identifier is within a polygon. FIG. 11B illustrates a scenario in which multiple comparisons may be needed to reveal a hit in accordance with some embodiments. In FIG. 6B, the set of geohash tiles is not represented by a single leaf. Rather, the geohash tree for that set of tiles includes multiple nodes, some of which are branches and others of which are leafs, as illustrated in FIG. 6D. Therefore, the process of determining whether the receive location identifier is within an polygon includes comparing the query geohash code of the location identifier to the geohash tree, one character at a time, from the top node of the geohash tree to the bottom node of the geohash tree. If the first (e.g., the most significant) character of the query geohash code matches one of the geohash trees in the index system, then the query geohash code is compared against that tree structure's lower nodes, one node at a time.

Once the QR module 114 identifies at least one character in the query geohash code that is not represented by the geohash index system, then the QR module 114 can move to step 914, indicating that the location identifier is not within an polygon. Any mismatch means the phone does not lie within the area of interest. On the other hand, if the QR module 114 reaches the leaf node and the character in the leaf node matches the corresponding character in the query geohash code, then the QR module 114 can indicate that the location identifier is within the polygon modeled by the geohash tree.

In some embodiments, the index system (e.g., the geohash tree) is designed to yield fast comparison performance, returning an answer in microseconds using a single core of a commodity server. In some embodiments, the index system can be designed to be re-entrant, so lookups can scale out and take advantage of all available cores in the system without any adverse performance impacts due to lock conflicts.

In some embodiments, the index system can include information on polygons corresponding to each geohash tile modeled by the index system. For example, the IG module 112 can determine a list of all polygons that includes a particular geohash tile, and associate that list to the leaf node corresponding to the particular geohash tile. This way, the index system can maintain a correspondence between a geohash tile and all polygons that includes the geohash tile. Subsequently, when the QR module 114 finds a match between a query geohash code and the index system, the QR module 114 can return not only an identifier associated with the polygon, but also the specific polygons within the polygon that contributed to the match between the query geohash code and the index system.

In some embodiments, a polygon can include one or more group identifiers. Group identifiers, can, for example relate to a campaign for advertisements. For example, a campaign can include a plurality of polygons that collectively define areas to which a particular advertisement campaign can be targeted. Each campaign can be associated with an identifier that identifies the associated advertisement. In some embodiments, an index system corresponding to a campaign can be stored in a single file. Each campaign file may contain many thousands of individual polygons (also referred to as geofences). For example, a campaign file can include all McDonalds' locations within a 10 km radius of New York Penn Station.

In some embodiments, the IG module 112 can be configured to merge multiple indices into a single index. In some embodiments, the IG module 112 can be configured to remove a group from an existing index system. For example, the IG module 112 can traverse the existing index system (e.g., the tree), remove geohash codes associated with the group to be removed, and recursively rebuild the portion of the existing index system (e.g., a sub-tree) with the remaining geohash codes.

In some embodiments, the IG module 112 can provide the geohash index system to the client 106 so that the client 106 can directly serve location queries from other devices, such as mobile devices. In some cases, the IG module 112 can use a delta compression technique to provide only modified parts of the geohash index system to the client 106. The client 106 can use double buffering techniques to change its current index system to bring it up to date with the new geohash index system, without impacting existing query performance. For example, the client 106 can maintain the current index system in memory and then load the new index system into memory while still processing requests by based on the current index system. Once the new index system is fully loaded into memory and ready to respond to queries, a pointer to the current index system can instead reference the new index system such the requests are processed by referencing the new index system. Once that step is complete, the current index system can be deallocated from memory. To accommodate these processes, it may be desirable for the client 106 to have enough memory to store both the current index system and the new index system.

In some embodiments, the host server 102 can provide an application programming interface (API) or web interface to allow advertisement service entities to create a geohash index system for advertisement. For example, the API or web interface can allow the entities to generate a group using simple query criteria such as 'within a 1 mile radius of businesses of type x in region y'. Once the entities select one or more polygons that represent the advertisement group, the host server 102 can use the above described method to generate the index system for the group. The index system can be represented as an index file. Then the host server can transmit the index file to clients 106 (e.g., group (e.g. campaign) owner/advertisement networks machines/servers) with a QR module 114 so that the index file can be incorporated into the existing index system in the client 106. This allows the QR module 114 in the client devices 106 to directly serve the location queries from mobile devices, instead of requesting the host server 102 to resolve the location queries.

In some embodiments, the IG module 112 can be configured to generate an index system that is capable of returning a set of polygons intersecting with a particular location. Such an index system can be useful in a variety of applications. In particular, such an index system can facilitate a mechanism for providing information and grouping identifiers of a particular location, collectively referred to as a payload data of a particular location. For instance, the QR module 114 can use such an index system to determine one or more identifiers of polygons associated with the particular location and to use the one or more identifiers of polygons to retrieve the payload data for the particular location from a database.

More particularly, a grouping identifier can be associated with a group of polygons to be represented together. The grouping identifier can be useful to associate the same property to each of the polygons identified in the group of polygons. For example, an advertising campaign by Carl's Jr can target its advertisement to users who are near either a McDonald's restaurant or a Burger King restaurant. In this case, the advertising campaign can be tagged with a campaign identifier "carls"; one or more polygons associated with the McDonald's restaurant can be tagged with a grouping identifier "mcd"; and one or more polygons associated with the Burger King restaurant can be tagged with a grouping identifier "bk". Furthermore, the grouping identifiers "mcd" and "bk" can be associated with the advertising campaign identifier "carls." Subsequently, when an advertiser wants to post advertisements for Carl's, the advertiser can use the association between the campaign identifier "carls" and the grouping identifiers "mcd" and "bk" to identify all polygons to be associated with the advertisement campaign.

Figure 12:
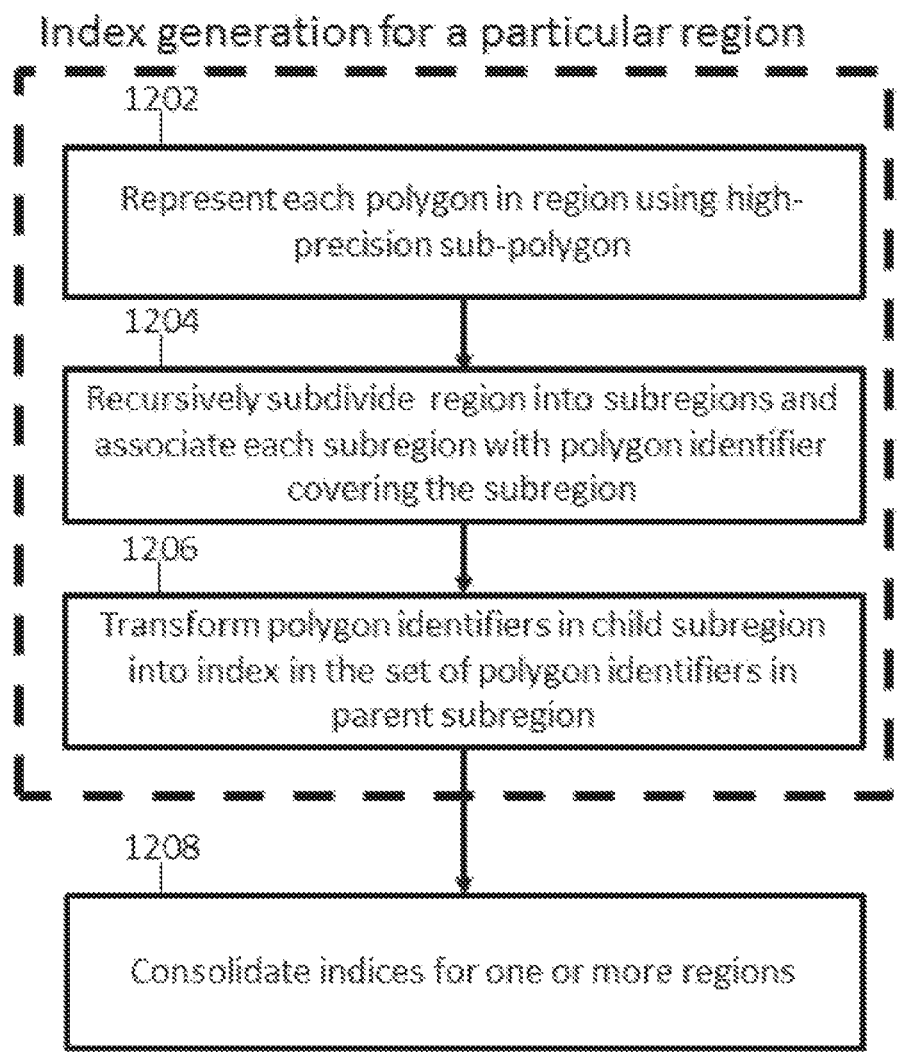
FIG. 12 illustrates a process for building an index system associated with a set of regions of interest in accordance with some embodiments.

FIG. 12 illustrates a process for building an index system that is capable of returning a set of polygons intersecting with a particular location in accordance with some embodiments. The index system can represent one or more regions of interest, where each region of interest can include one or more polygons, and each polygon can be associated with a unique polygon identifier. The polygon identifier can include a string of characters, e.g., including numbers, which refers to a specific polygon. The polygon identifier can be a UUID having, for example, 128 bits, or an integer having, for example, 32 or 64 or some other number of bits. The polygon identifier can point to a specific entity of interest, for example, a specific McDonald's restaurant at a specific address rather than McDonald's restaurants in general, which may be represented by an index or a group identifier.

When the IG module 112 is configured to generate an index system for one region of interest, the IG module 112 is configured to generate an index system for that region by iterating steps 1202-1206. When the IG module 112 is configured to generate an index system for more than one region of interest, the IG module 112 is configured to generate an index system for each region independently by iterating steps 1202-1206, and consolidate the index systems for each region as a post-processing step in step 1208.

In some embodiments, the index system for a region can have a tree structure. Therefore, the index system for a region can be referred to as an index tree. A node in the index tree can be associated with a sub-region of a region. Each node in the index tree can also be associated with one or more identifiers of polygon(s) that intersect with the sub-region associated with the node.

In some embodiments, the IG module 112 is configured to process the index tree so that one or more polygon identifiers associated with a node can be represented succinctly. For example, the IG module 112 has a mechanism for declaring a particular polygon identifier as a leaf identifier. When the IG module 112 declares a particular polygon identifier as a leaf identifier at a particular node, then all children nodes of the particular node are deemed to be associated with the particular polygon identifier. This way, the IG module 112 obviates the need to explicitly associate the leaf identifier with every child node, thereby reducing redundant associations of polygon identifiers in the index tree.

More particularly, in step 1202, the IG module 112 is configured to represent (e.g., tessellate) a polygon in a region using a plurality of tiles (e.g., sub-polygons). A sub-polygon is designed to cover an area whose size depends on a predetermined level of precision associated with the sub-polygon. For example, when the precision is low, the sub-polygon covers a large area; when the precision is high, the sub-polygon covers a small area.

The IG module 112 is also configured to associate a sub-polygon with an identifier of the polygon from which the sub-polygon is derived. For example, when a polygon is divided into 32 sub-polygons, each of the sub-polygons is associated with a polygon identifier of the original polygon. If a region includes more than one polygon, this process is repeated for each polygon in the region. Therefore, a single sub-polygon can be associated with a plurality of polygon identifiers. Subsequently, the sub-polygons used to represent polygons in the region can be grouped together to represent the region.

In step 1204, the IG module 112 is configured to recursively subdivide the region into sub-regions and associate each sub-region with a polygon identifier covering the sub-region. More particularly, the IG module 112 is first configured to identify one or more unique identifiers of polygons in the region. Then, the IG module 112 is configured to iteratively subdivide the region into sub-regions (and sub-regions into smaller sub-regions), and assign one or more of the unique polygon identifiers to a sub-region if the sub-region intersects with polygons represented by the unique polygon identifiers. Since each sub-polygon is associated with one or more polygon identifiers, the IG module 112 can determine a set of polygon identifiers associated with each sub-region.

As the IG module 112 iteratively subdivide a region into sub-regions (and sub-regions into smaller sub-regions), the IG module 112 can build an index tree corresponding to the region. FIGS. 13A-13D illustrate a process of building an index tree corresponding to a region in accordance with some embodiments.

Figure 13A:
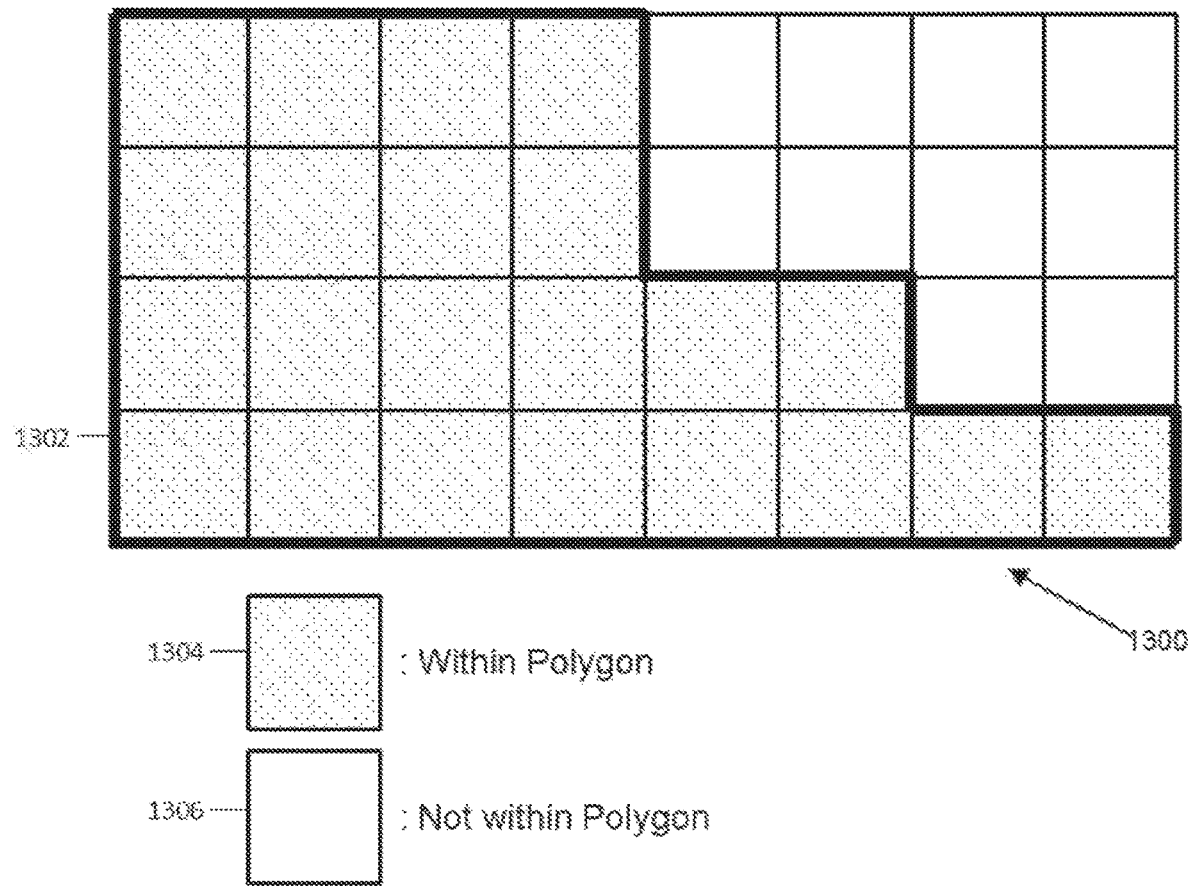
FIGS. 13A-13D illustrate a process of building an index tree corresponding to a region in accordance with some embodiments.

FIG. 13A illustrates a region 1300 that includes a plurality of tiles (e.g., sub-polygons, illustrated as small squares), where each tile is associated with a location identifier, such as a geohash code. The region 1300 can represent one or more polygons that are illustrated using dotted tiles. For example, a dotted tile 1304 indicates a tile that belongs to one or more polygons in the region 1300; an empty tile 1306 indicates a tile that is outside of one or more polygons in the region 1300. For the purpose of illustration, the following exemplary descriptions deem the region 1300 to include a single polygon 1302, but the descriptions are also applicable to cases in which the region 1300 includes multiple polygons.

Figure 13B:
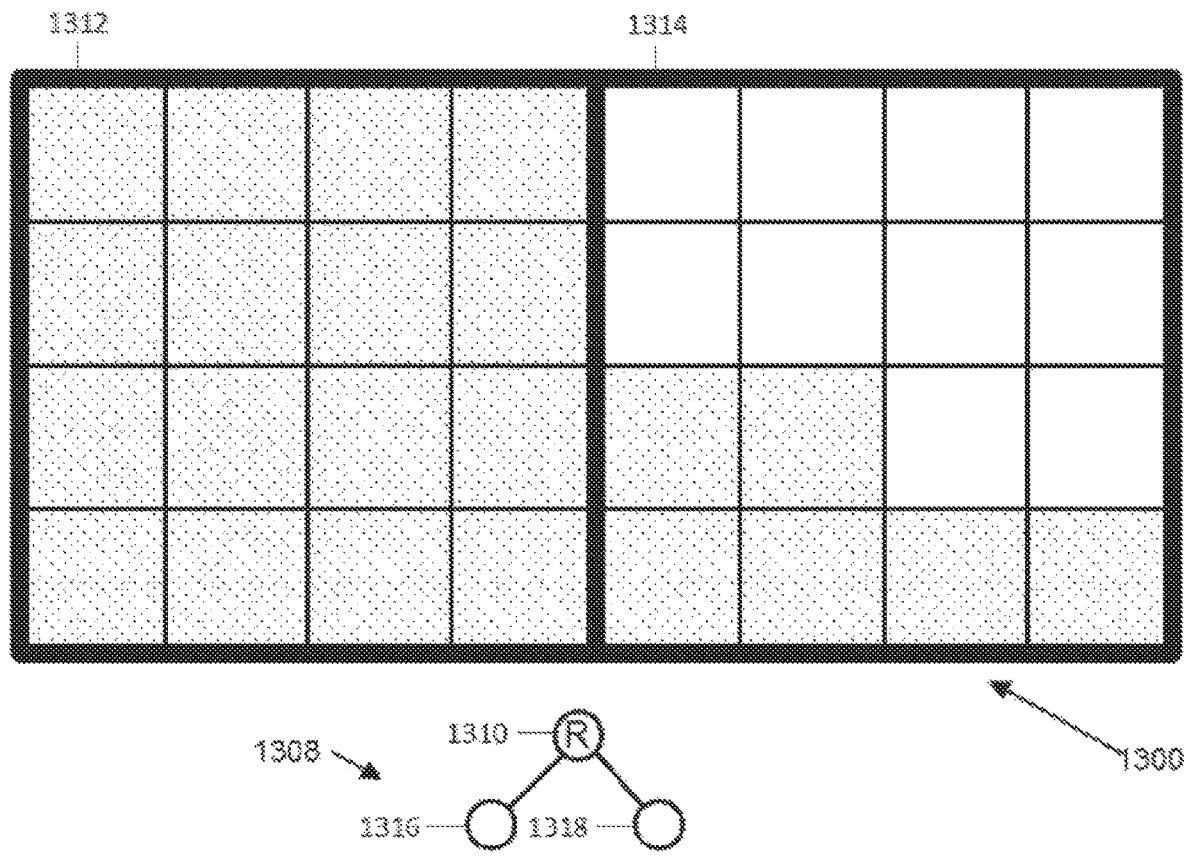

To generate an index tree for the region 1300, the IG module 112 can instantiate an index tree 1308 with a single root node corresponding to the entire region 1300. FIG. 13B illustrates the region 1300 and the index tree 1308 having a single root node 1310 corresponding to the entire region 1300. Subsequently, the IG module 112 can subdivide the region 1300 into two sub-regions 1312, 1314, and add nodes 1316, 1318 corresponding to the sub-regions 1312, 1314. Also, the IG module 112 can associate the nodes 1316, 1318 with polygon identifiers of polygons that intersect with the sub-regions 1312, 1314, respectively.

Subsequently, the IG module 112 can determine whether a polygon covers an entire area represented by a sub-region 1312 or 1314. If so, the IG module 112 can mark the polygon identifier of that polygon as a leaf identifier for that sub-region (or a node corresponding to that sub-region), which indicates that all sub-trees rooted at that sub-region include that leaf polygon identifier. In the example shown in FIG. 13B, every tile in the sub-region 1312 includes the same polygon identifier corresponding to the polygon 1302. Therefore, the polygon 1302 covers an entire area represented by the sub-region 1312. Thus, the polygon identifier corresponding to the polygon 1302 in the node 1316 is a leaf identifier at the node 1316.

In some embodiments, if all polygon identifiers associated with a node is a leaf identifier, then the IG module 112 can stop building the index tree 1308 for the sub-region corresponding to that node (e.g., stop sub-dividing the sub-region corresponding to that node). In the example shown in FIG. 13B, since the region 1300 includes only a single polygon 1302, all polygon identifiers associated with the node 1316 is a leaf identifier. Therefore, the IG module 112 can stop sub-dividing the sub-region 1312 corresponding to the node 1316. On the other hand, not every tile in the sub-region 1314 includes the same polygon identifier corresponding to the polygon 1302. For instance, some of the tiles in the sub-region 1314 does not intersect with the polygon 1302. Therefore, the polygon identifier associated with the node 1318 is not a leaf identifier. Thus, the IG module 112 is configured to further sub-divide the sub-region 1314.

Figure 13C:
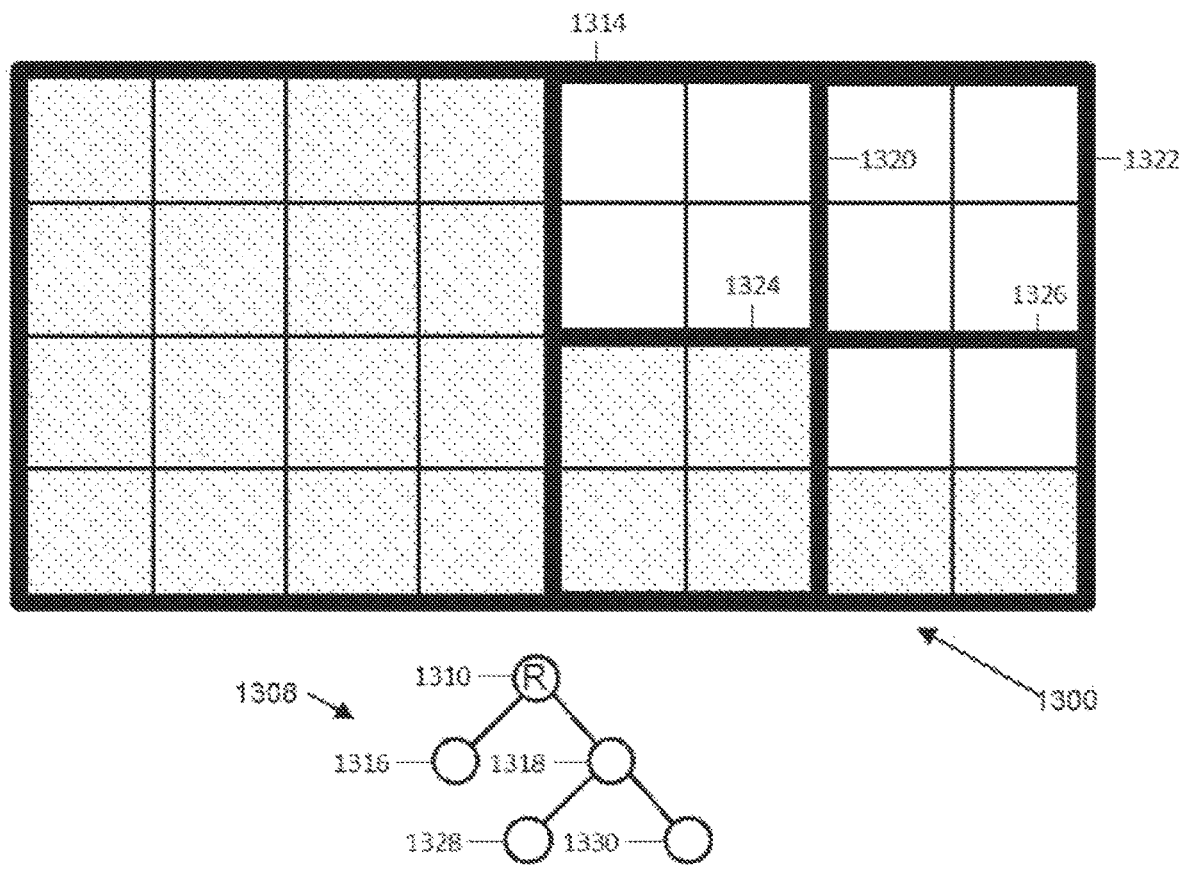

FIG. 13C illustrates a division of the sub-region 1314 into sub-regions 1320, 1322, 1324, and 1326. Because only the sub-regions 1324, 1326 include a tile of the polygon 1302, the IG module 112 is configured to generate only two additional nodes 1328, 1330 in the index tree 1308 associated with the sub-regions 1324, 1326, respectively, and discard sub-regions 1320, 1322 from further processing.

Furthermore, the IG module 12 can stop sub-dividing the sub-region 1324 corresponding to the node 1328. Every tile in the sub-region 1324 includes the polygon identifier of the polygon 1302. Therefore, the polygon identifier of the polygon 1302 in the node 1328 is a leaf identifier. Furthermore, since the region 1300 includes only a single polygon 1302, all polygon identifiers associated with the node 1328 is a leaf identifier. Therefore, the IG module 112 can stop sub-dividing the sub-region 1324 corresponding to the node 1328.

On the other hand, the IG module 112 is configured to further sub-divide the sub-region 1326. Not every tile in the sub-region 1326 includes the polygon identifier of the polygon 1302. For example, some of the tiles in the sub-region 1326 does not intersect with the polygon 1302. Therefore, at least one of the polygon identifiers in the node 1330 is not a leaf polygon identifier. Therefore, the IG module 112 is configured to further sub-divide the sub-region 1326.

Figure 13D:
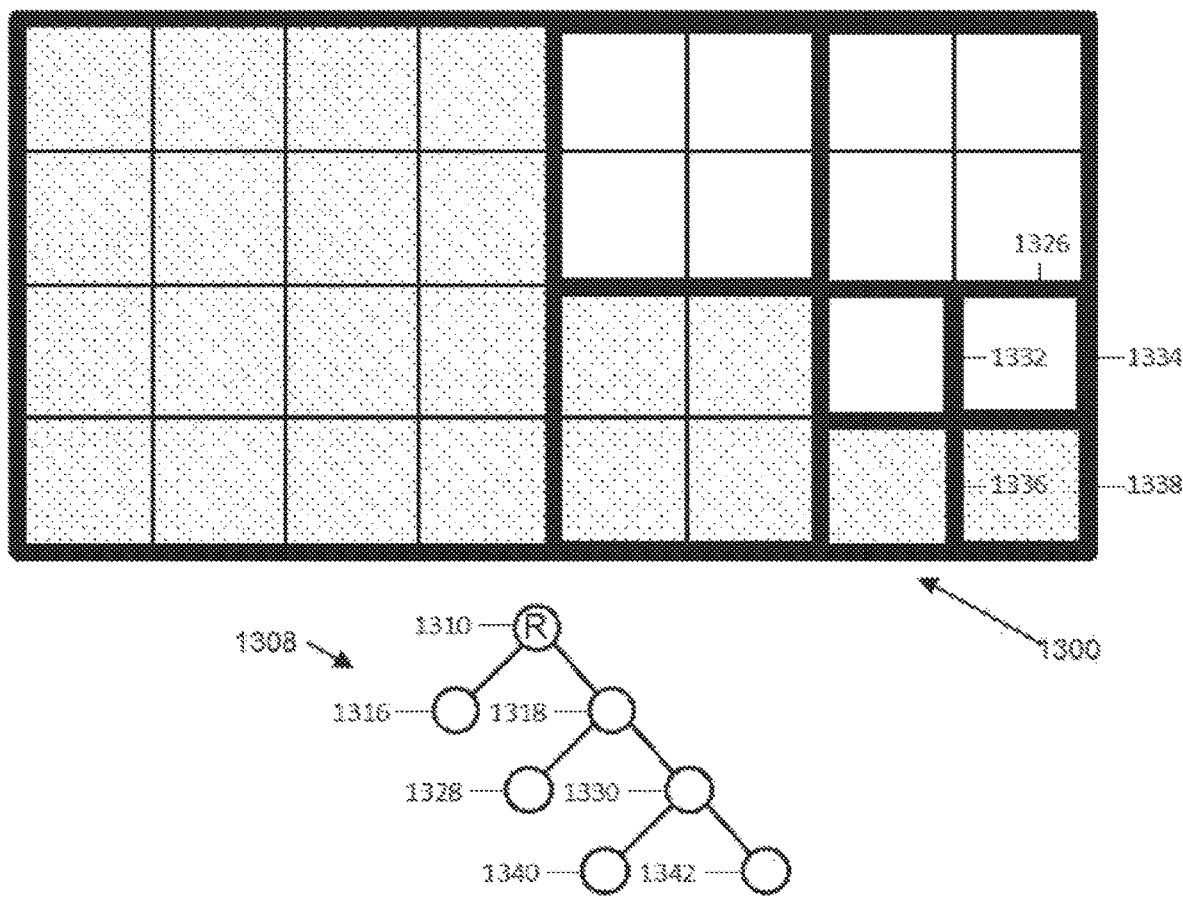

FIG. 13D illustrates a division of the sub-region 1326 into sub-regions 1332, 1334, 1336, and 1338. Through a similar process as outlined above, the IG module 112 is configured to add two additional nodes 1340, 1342 to the index tree 1308, corresponding to sub-regions 1336, 1338, respectively.

In some embodiments, once the IG module 112 completes the index generation process, the IG module 112 can be configured to traverse the index tree 1308 from the leaf nodes (e.g., nodes 1340, 1342) to the root node (e.g., node 1310) to reduce the number of polygon identifiers associated with the index tree 1308. The IG module 112 is configured to determine whether all children nodes of a particular node (also referred to as a parent node) share the same polygon identifier. If so, the IG module 112 is configured to remove that polygon identifier from all children nodes, associate the parent node with that polygon identifier, and declare that polygon identifier as the leaf identifier at the parent node. This reduction process can reduce the number of polygon identifiers at the highest precision nodes (e.g., nodes furthest away from the root node).

In some embodiments, the IG module 112 can reduce a number of bits used to represent a polygon identifier in the index tree. To this end, the IG module 112 is configured to present a polygon identifier in a child node as an offset into a set of polygon identifiers in the parent node. For example, suppose that a parent node is associated with three polygon identifiers: [021y4bcfjkp26rsx, pr2swz25xyqebc13, fm0qrx36zmn79fjpq], and has a child node that is associated with two polygon identifiers: [021y4bcfjkp26rsx, fin0qrx-36zmn79fjpq]. Instead of actually writing out the polygon identifiers in the child node, the IG module 112 can be configured to represent the polygon identifiers in the child node as an index into the three polygon identifiers in the parent node. Under this scheme, the IG module 112 can represent the two polygon identifiers in the child node as [1, 3]. This representation can reduce the number of bits used to represent polygon identifiers in the index tree.

Once the index tree is constructed, the IG module 112 can encode the index tree (e.g., the polygon identifiers in each node of the index tree, the set of leaf polygon identifiers) into an index system, as illustrated in FIG. 8B in accordance with some embodiments.

Once the IG module 112 completes the index system generation for a region, the IG module 112 can encode all the payload data associated with the region so that the data associated with the region (or a polygon within the region) can be retrieved quickly. To limit the magnitude of the offsets/jump indexes encoded at each sub-region level (e.g., each level in the index tree), the IG module 112 is configured to encode each level's data into a separate substream, including a sub-index or an independent portion of the index.

Subsequently, the IG module 112 can write out this substream data (for each level in the index tree) at the head of the total payload data representing the entire region represented by the index tree. The IG module 112 can write out all polygon identifiers represented within the given region. Then, the IG module 112 can encode the hierarchical region/sub-region index tree, using a technique such a geohash encoding. These operations can complete the index generation process and the payload database generation process for a region.

If there are more than one regions of interest, the IG module 112 can repeat steps 1202-1206 for each region of interest, and generate an index system for each region. Once the index system for each region is constructed, in step 1208, the IG module 112 is configured to merge the index systems into a single master index system so that the single master index system can represent all regions of interest. In some embodiments, the single master index system can have a tree structure, and the tree structure can be based on geohash codes. Each leaf node of the single master index system can correspond to a region-level index system generated in steps 1202-1206.

The index generation process of FIG. 12 is beneficial because region-level index systems can be generated in parallel using a distributed computing system. Since regions can be independent of one another, the IG module 112 can assign a single computer to generate an index system for one region without worrying about an index system for another region. This allows for a parallel computation of region-level index systems, thereby providing a computationally scalable mechanism for generating indices for many regions of interest. Furthermore, the index generation process of FIG. 12 allows the IG module 112 to quickly update the index system by building and encoding the index tree of only the region that needs to be updated.

The QR module 114 can use the master index system generated by the IG module 112, as illustrated in FIG. 12, to respond to a location query from a client. In particular, the QR module 114 can use the master index system to determine one or more polygons intersecting a location identified in the location query and provide any payload data associated with the one or more polygons to the client.

Figure 14:
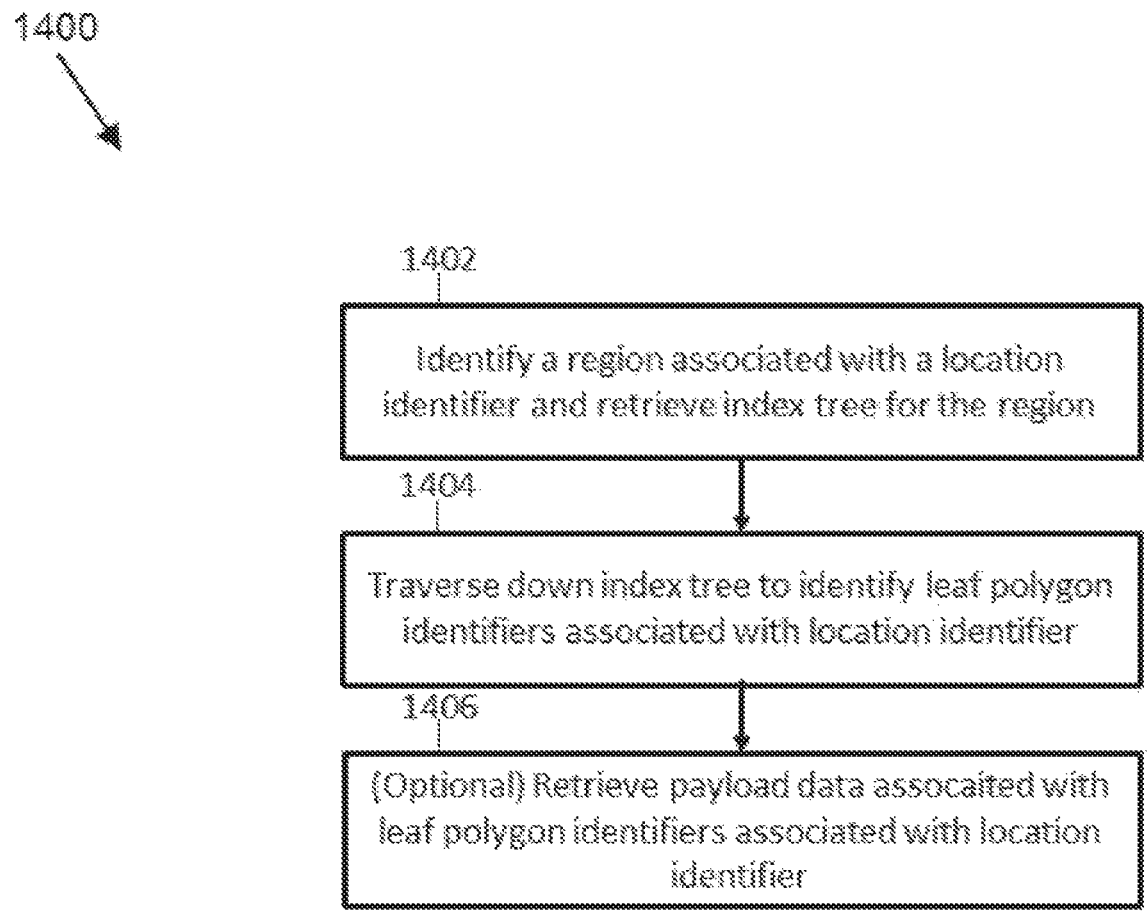
FIG. 14 illustrates a process for responding to a location query in accordance with some embodiments.

FIG. 14 illustrates a process 1400 for responding to a location query in accordance with some embodiments. In step 1402, the QR module 114 receives the location query and extracts a location identifier, such as a [latitude, longitude] pair or a geohash code, from the location query. The location associated with the location identifier is referred to as a target location. Then the QR module 114 can identify the region that includes the target location, and retrieve, from the master index system, the region-level index system corresponding to that region. Subsequently, the QR module 114 can allocate memory space to hold the set of polygon identifiers represented by the region, as encoded in the index tree corresponding to the region. The memory space can be used to hold identifier(s) of polygon(s) that intersect with the target location.

In step 1404, the QR module 114 can walk down the region-level index system to find sub-regions of the region that also intersect with the target location. As the QR module 114 traverses down the index tree, at each node during the traversal, the QR module 114 can collect leaf polygon identifiers associated with the node. Then the QR module 114 can narrow the potential set of potential leaf identifiers that might be found in subsequent iterations. For example, as the QR module 114 walks down the node hierarchy of the index tree, the set of polygon identifiers relevant to a particular node corresponding to a particular sub-region is restricted to the polygon identifiers associated with the parent node of the particular node. Once the QR module 114 reaches the leaf node of the region-level index system (e.g., the highest precision level of the region-level index system), the QR module 114 can terminate the traversal of the region-level index system. The resulting set of leaf polygon identifiers represents the set of polygons intersecting the location identifier.

In step 1406, once the QR module 114 identifies all polygons intersecting the target location, the QR module 114 can retrieve payload data associated with the polygons using their identifiers. For example, the QR module 114 can request a database table or a hash table to retrieve any data, such as the name or address, associated with a particular polygon identifier. Subsequently, the QR module 114 can provide, to the client that sent the location query, the set of polygon identifiers associated with the target location and any retrieved data associated with the polygons.

While the foregoing embodiments have been illustrated primarily using geohash codes and geohash tiles, the foregoing embodiments can use other location identification mechanisms as well.

For example, in any of the embodiments disclosed herein, a region can be represented by any type of a location identifier associated with a hierarchical location identifier system, including, for instance, a hash-based location identifier and/or a quad tree-based location identifier. Under the hierarchical location identifier systems, a concatenation of a location identifier, associated with a region, with one additional bit (or character) can refer to one of a predetermined number of sub-regions contained within the region. For instance, a concatenation of a location identifier, associated with a region, with one additional bit can refer to one of 4 sub-regions, 8 sub-regions, or 16 sub-regions contained within the region. Also, for instance, a concatenation of a location identifier, associated with a region, with one additional sequence of bits or one additional character can refer to one of 4 sub-regions, 8 sub-regions, or 16 sub-regions contained within the region.

As another example, in any of the embodiments disclosed herein, a region can be represented by any type of a location identifier that can be associated with a particular geographic/physical precision. For instance, a data structure, such as a probabilistic data structure including a bloom filter, may be associated with one of a predetermined set of precisions (e.g. 1 m, 3 m, 5 m, and 10 m) and can encode a location identifier associated with the one of the predetermined set of precisions in, for example, as few bits as possible.

In some embodiments, the client 106 can include user equipment of a cellular network. The user equipment communicates with one or more radio access networks and with wired communication networks. The user equipment can be a cellular phone having phonetic communication capabilities. The user equipment can also be a smart phone providing services such as word processing, web browsing, gaming, e-book capabilities, an operating system, and a full keyboard. The user equipment can also be a tablet computer providing network access and most of the services provided by a smart phone. The user equipment operates using an operating system such as Symbian OS, iPhone OS, RIM's Blackberry, Windows Mobile, Linux, HP WebOS, and Android. The screen might be a touch screen that is used to input data to the mobile device, in which case the screen can be used instead of the full keyboard. The user equipment can also keep global positioning coordinates, profile information, or other location information.

The client 106 also includes any platforms capable of computations and communication. Non-limiting examples can include computers, netbooks, laptops, servers, and any equipment with computation capabilities. The client 106 is configured with one or more processors that process instructions and run software that may be stored in memory. The processor also communicates with the memory and interfaces to communicate with other devices. The processor can be any applicable processor such as a system-on-a-chip that combines a CPU, an application processor, and flash memory. The client 106 can also provide a variety of user interfaces such as a keyboard, a touch screen, a trackball, a touch pad, and/or a mouse. The client 106 may also include speakers and a display device in some embodiments.

In some embodiments, the host server 102 can reside in a data center and form a node in a cloud computing infrastructure. The host server 102 can also provide services on demand. A module hosting a client is capable of migrating from one server to another server seamlessly, without causing program faults or system breakdown. The host server 102 on the cloud can be managed using a management system.

Other embodiments are within the scope and spirit of the disclosed subject matter.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium. Indeed "module" is to be interpreted to include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The terms "a" or "an," as used herein throughout the present application, can be defined as one or more than one. Also, the use of introductory phrases such as "at least one" and "one or more" should not be construed to imply that the introduction of another element by the indefinite articles "a" or "an" limits the corresponding element to only one such element. The same holds true for the use of definite articles.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. An apparatus comprising:
a processor and non-volatile memory comprising a set of computer-readable instructions, wherein the processor is configured to execute the computer readable instructions to:
represent a region of interest with one or more polygons;
determine a plurality of sub-polygons that are contained within the one or more polygons, wherein each of the sub-polygons is associated with a unique code; and
generate an index system based on at least a subset of the plurality of sub-polygons,
wherein in response to receiving a location identifier from a client device, the processor is further configured to execute the computer-readable instructions to:
compare a query identifier corresponding to the location identifier with the index system to determine that the location identifier is within the region of interest, wherein the step of comparing includes:
comparing a first set of bits of one or more bits in the query identifier, corresponding to a lower-precision sub-polygon, to bits in the index system, corresponding to sub-polygons in the region of interest; and
comparing a second set of bits of the one or more bits in the query identifier, corresponding to a higher-precision sub-polygon, to bits in the index system, corresponding to the sub-polygons in the region of interest; and
provide a service associated with the region of interest to the client device over a communication network based on determining that the location identifier is within the region of interest.

2. The apparatus of claim 1, wherein the location identifier is based on a hierarchical encoding scheme.

3. The apparatus of claim 1, wherein the index system comprises an index tree, and in response to the first set of bits of the one or more bits in the query identifier matches a first index of the index system corresponding to a leaf node of the index tree, the processor determines whether the query identifier is within the region of interest.

4. The apparatus of claim 1, wherein the processor is further configured to process a polygon identifier associated with the query identifier and retrieved from the index system, determine a group identifier associated with the polygon identifier, and provide a service associated with the group identifier to the client device over the communication network.

5. The apparatus of claim 1, wherein the processor is further configured to process a polygon identifier associated with the query identifier and retrieved from the index system, and initiate transmission of information associated with the polygon identifier to the client device over the communication network.

6. The apparatus of claim 1, wherein the processor is further configured to perform the step of comparing the first set of bits of the one or more bits in the query identifier to the bits in the index system before the step of comparing the second set of bits of the one or more bits in the query identifier to the bits in the index system.

7. The apparatus of claim 1, wherein the processor is further configured to provide the service associated with the region of interest to the client device over the communication network after determining that the location identifier provided by the client device is within the region of interest.

8. The apparatus of claim 1, wherein the location identifier is associated with the client device's location.

9. A computer-implemented method comprising:
representing a region of interest with one or more polygons;
determining a plurality of sub-polygons that are contained within the one or more polygons; wherein each of the sub-polygons is associated with a unique code; and
generating an index system based on at least a subset of the plurality of sub-polygons, wherein in response to receiving a location identifier from a client device the computer-implemented method further comprises:
comparing a query identifier corresponding to the location identifier with the index system to determine that the location identifier is within the region of interest, wherein the step of comparing includes:
comparing a first set of bits of one or more bits in the query identifier, corresponding to a lower-precision sub-polygon, to bits in the index system, corresponding to sub-polygons in the region of interest; and
comparing a second set of bits of the one or more bits in the query identifier; corresponding to a higher-precision sub-polygon, to bits in the index system, corresponding to the sub-polygons in the region of interest; and
providing a service associated with the region of interest to the client device over a communication network based on determining that the location identifier is within the region of interest.

10. The method of claim 9, wherein the location identifier is based on a hierarchical encoding scheme.

11. The method of claim 9, wherein the index system comprises an index tree, and in response to determining that the first set of bits of the one or more bits in the query identifier matching a first index of the index system corresponding to a leaf node of the index tree, determining whether the query identifier is within the region of interest.

12. The method of claim 9, further comprising processing a polygon identifier associated with the query identifier and retrieved from the index system, determining a group identifier associated with the polygon identifier, and providing a service associated with the group identifier to the client device over the communication network.

13. The method of claim 9, further comprising processing a polygon identifier associated with the query identifier and retrieved from the index system, and initiating transmission of information associated with the polygon identifier to the client device over the communication network.

14. The method of claim 9, further comprising performing the step of comparing the first set of bits of the one or more bits in the query identifier to the bits in the index system before the step of comparing the second set of bits of the one or more bits in the query identifier to the bits in the index system.

15. The method of claim 9; further comprising providing the service associated with the region of interest to the client device over the communication network after determining that the location identifier provided by the client device is within the region of interest.

16. The method of claim 9, wherein the location identifier is associated with the client device's location.

17. A non-transitory computer readable medium having instructions executable by a data processing apparatus to:
represent a region of interest with one or more polygons;
determine a plurality of sub-polygons that are contained within the one or more polygons,
wherein each of the sub-polygons is associated with a unique code; and
generate an index system based on at least a subset of the plurality of sub-polygons,
wherein in response to receiving a location identifier from a client device the instructions are further executable by the data processing apparatus to:
compare a query identifier corresponding to the location identifier with the index system to determine that the location identifier is within the region of interest, wherein the step of comparing includes:
comparing a first set of bits of one or more bits in the query identifier, corresponding to a lower-precision sub-polygon, to bits in the index system, corresponding to sub-polygons in the region of interest; and
comparing a second set of bits of the one or more bits in the query identifier, corresponding to a higher-precision sub-polygon, to bits in the index system, corresponding to the sub-polygons in the region of interest; and
provide a service associated with the region of interest to the client device over a communication network based on determining that the location identifier is within the region of interest.

18. The medium of claim 17, wherein the location identifier is based on a hierarchical encoding scheme.

19. The medium of claim 17, wherein the index system comprises an index tree, and in response to determining that the first set of bits of the one or more bits in the query identifier matching a first index of the index system corresponding to a leaf node of the index tree, the instructions are further executable by the data processing apparatus to determine whether the query identifier is within the region of interest.

20. The medium of claim 17, wherein the instructions are further executable by the data processing apparatus to process a polygon identifier associated with the query identifier and retrieved from the index system, determine a group identifier associated with the polygon identifier, and provide a service associated with the group identifier to the client device over the communication network.

21. The medium of claim 17, wherein the instructions are further executable by the data processing apparatus to process a polygon identifier associated with the query identifier and retrieved from the index system, and initiate transmission of information associated with the polygon identifier to the client device over a the communication network.

22. The medium of claim 17, wherein the instructions are further executable by the data processing apparatus to perform the step of comparing the first set of bits of the one or more bits in the query identifier to the bits in the index system before the step of comparing the second set of bits of the one or more bits in the query identifier to the bits in the index system.

23. The medium of claim 17, wherein the instructions are further executable by the data processing apparatus to provide the service associated with the region of interest to the client device over the communication network after determining that the location identifier provided by the client device is within the region of interest.

24. The medium of claim 17, wherein the location identifier is associated with the client device's location.

* * * * *